(12) United States Patent
Park et al.

(10) Patent No.: US 11,189,919 B2
(45) Date of Patent: Nov. 30, 2021

(54) BEAM-FORMING CIRCUIT FOR 5G MOBILE COMMUNICATION AND RADAR

(71) Applicant: Korea Advanced Institute of Science and Technology, Daejeon (KR)

(72) Inventors: Jinseok Park, Daejeon (KR); Song-Cheol Hong, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 365 days.

(21) Appl. No.: 16/468,060

(22) PCT Filed: Sep. 5, 2018

(86) PCT No.: PCT/KR2018/010345
§ 371 (c)(1),
(2) Date: Jun. 10, 2019

(87) PCT Pub. No.: WO2019/050264
PCT Pub. Date: Mar. 14, 2019

(65) Prior Publication Data
US 2020/0021024 A1 Jan. 16, 2020

(30) Foreign Application Priority Data

Sep. 11, 2017 (KR) .................. 10-2017-0115812

(51) Int. Cl.
*H01Q 3/22* (2006.01)
*H01Q 3/36* (2006.01)
*H01Q 23/00* (2006.01)

(52) U.S. Cl.
CPC ............... *H01Q 3/36* (2013.01); *H01Q 23/00* (2013.01)

(58) Field of Classification Search
CPC .......... H01Q 3/22; H01Q 3/26; H01Q 3/2605; H01Q 3/36; H01Q 23/00; H01Q 25/00
(Continued)

(56) References Cited

U.S. PATENT DOCUMENTS

2014/0132450 A1  5/2014  Chen et al.
2015/0341104 A1  11/2015 Small
(Continued)

FOREIGN PATENT DOCUMENTS

KR  10-2016-0076734 A  7/2016
KR  10-2017-0003837 A  1/2017

OTHER PUBLICATIONS

International Search Report dated Dec. 5, 2018 for International Application No. PCT/KR2018/010345; 4 Pages.

*Primary Examiner* — Harry K Liu
(74) *Attorney, Agent, or Firm* — Daly Crowley Mofford & Durkee, LLP

(57) ABSTRACT

A beam-forming circuit includes a multi mode power amplifier, a variable gain low noise amplifier, a variable gain phase shifter and a first switch circuit. The multi mode power amplifier amplifies a first RF intermediate signal generated based on a first RF input signal to generate a first RF output signal and performs a first transmission gain adjustment function based on a first control signal in a transmission mode. The variable gain low noise amplifier amplifies a second RF input signal to generate a second RF intermediate signal and performs a first reception gain adjustment function based on a second control signal in a reception mode. The variable gain phase shifter controls a gain and a phase of the first RF input signal at one time to generate the first RF intermediate signal and performs a second transmission gain adjustment function and a transmission phase adjustment function at one time based on a third control signal in the transmission mode, and controls a gain and a phase of the second RF intermediate signal at one time to generate a second RF output signal and performs a second reception gain adjustment function and a reception phase adjustment function at one time based on the third control signal in the reception mode. The first switch circuit (Continued)

receives the first RF input signal in the transmission mode, and outputs the second RF output signal in the reception mode.

20 Claims, 28 Drawing Sheets

(58) Field of Classification Search
USPC .......................................................... 342/372
See application file for complete search history.

(56) References Cited

U.S. PATENT DOCUMENTS

2016/0302208 A1* 10/2016 Sturkovich .......... H04B 7/0617
2017/0070247 A1    3/2017 Hageman et al.
2017/0264014 A1*  9/2017 Le-Ngoc ................ H01Q 21/06

\* cited by examiner

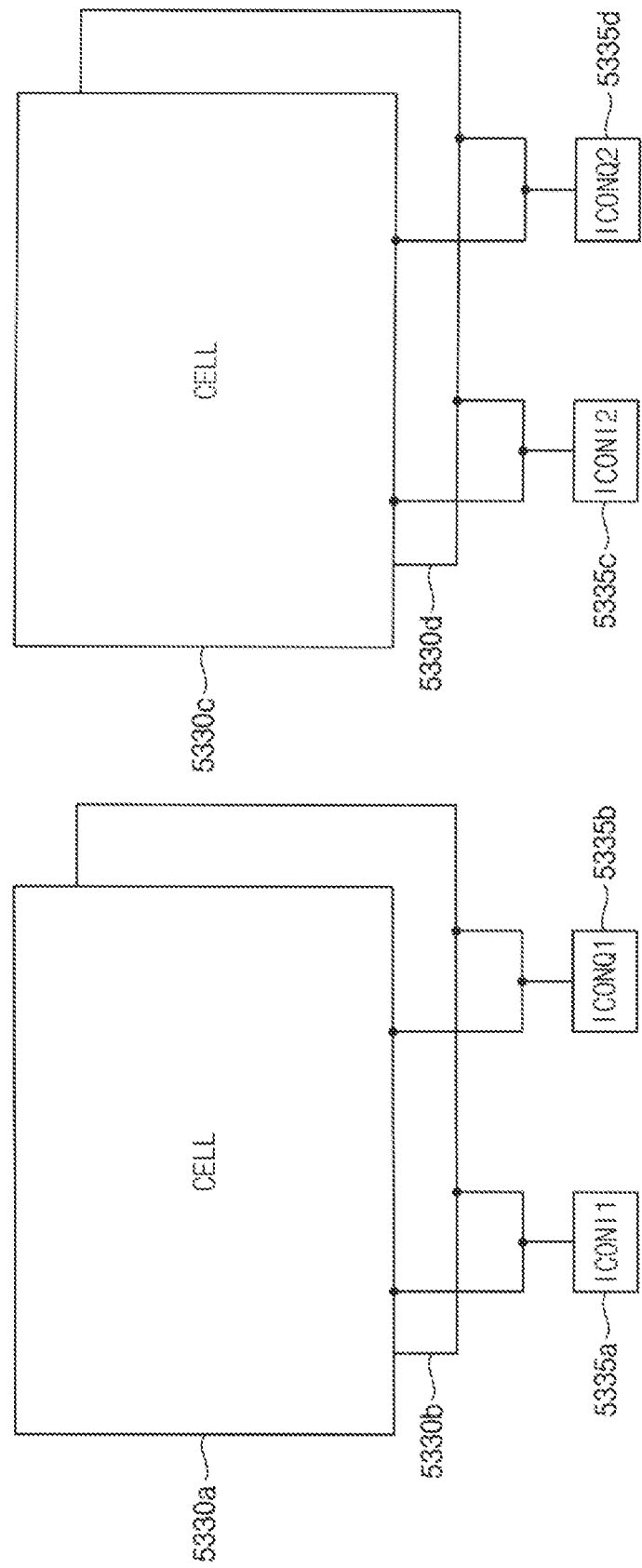

BEAM-FORMING CIRCUIT FOR 5G MOBILE COMMUNICATION AND RADAR

CROSS-REFERENCE TO RELATED APPLICATION

This application is a U.S. National Stage of PCT/KR2018/010345 filed in the Korean language on Sep. 5, 2018, entitled "BEAMFORMING CIRCUIT FOR RADAR AND 5G MOBILE COMMUNICATION," which application claims the priority under 35 USC § 119 to Korean Patent Application No. 10-2017-0115812, filed on Sep. 11, 2017 in the Korean Intellectual Property Office (KIPO), the contents of which are herein incorporated by reference in their entireties.

BACKGROUND

1. Technical Field

Example embodiments relate generally to signal processing techniques, and more particularly to beam-forming circuits for fifth generation (5G) mobile communication and radar that are applied to beam-forming systems.

2. Description of the Related Art

A fifth generation (5G) mobile communication system, which is currently being studied, requires a network capacity of about several tens to several hundreds times as compared with a long term evolution (LTE), which is a fourth generation (4G) mobile communication system. In addition, a communication technology based on millimeter wave communication is being studied to ensure wide bandwidth. In the millimeter wave band, a transmission/reception signal is weaker than a frequency band of a conventional 4G mobile communication system, and thus a technique such as beam-forming may be used to overcome this problem.

In a wireless communication, a beam-forming is a technique of a smart antenna, and is a technique for illuminating a beam of an antenna only to a corresponding terminal. Recently, a beam-forming technique for arranging antennas and adjusting a direction of an antenna beam by a phase difference between respective channels in the array has attracted attention. In this case, since one antenna and one beam-forming circuit are required for each channel, the total chip size and the total power consumption may be increased. In order to solve this problem, research is being conducted to implement a beam-forming circuit relatively simple.

Meanwhile, a conventional beam-forming circuit includes a phase shifter for phase adjustment and a variable gain amplifier (VGA) or an attenuator for gain adjustment. A passive phase shifter has a relatively large insertion loss, and thus there is a problem in that the size and power consumption are increased by adding a gain amplifier to compensate for the insertion loss. Since an attenuator also has a relatively large insertion loss, a problem is the same as that of the passive phase shifter, and it is difficult to represent high resolution. A VGA has a problem in that a dynamic range of gain control is narrow. Further, when the gain control is dependent only on the VGA or the attenuator, there is a problem in that it is difficult to increase the overall efficiency and linearity.

SUMMARY

Some example embodiments provide a beam-forming circuit for fifth generation (5G) mobile communication and radar capable of being implemented with ultra small size, low power and high performance characteristics.

According to example embodiments, a beam-forming circuit includes a multi mode power amplifier, a variable gain low noise amplifier, a variable gain phase shifter and a first switch circuit. The multi mode power amplifier amplifies a first radio frequency (RF) intermediate signal generated based on a first RF input signal to generate a first RF output signal to be transmitted via an antenna in a transmission mode, and performs a first transmission gain adjustment function based on a first control signal in the transmission mode. The variable gain low noise amplifier amplifies a second RF input signal received via the antenna to generate a second RF intermediate signal in a reception mode, and performs a first reception gain adjustment function based on a second control signal in the reception mode. The variable gain phase shifter controls a gain and a phase of the first RF input signal at one time to generate the first RF intermediate signal in the transmission mode, performs a second transmission gain adjustment function and a transmission phase adjustment function at one time based on a third control signal in the transmission mode, controls a gain and a phase of the second RF intermediate signal at one time to generate a second RF output signal in the reception mode, and performs a second reception gain adjustment function and a reception phase adjustment function at one time based on the third control signal in the reception mode. The first switch circuit receives the first RF input signal to provide the first RF input signal to the variable gain phase shifter in the transmission mode, and receives the second RF output signal from the variable gain phase shifter to output the second RF output signal in the reception mode.

In some example embodiments, the beam-forming circuit may further include a second switch circuit, a third switch circuit and a fourth switch circuit. The second switch circuit may connect one of the multi mode power amplifier and the first switch circuit with the variable gain phase shifter. The third switch circuit may connect one of the variable gain low noise amplifier and the first switch circuit with the variable gain phase shifter. The fourth switch circuit may connect one of the multi mode power amplifier and the variable gain low noise amplifier with the antenna.

In some example embodiments, in the transmission mode, a first path in which the first switch circuit, the third switch circuit, the variable gain phase shifter, the second switch circuit, the multi mode power amplifier, the fourth switch circuit and the antenna are sequentially connected may be enabled based on a mode selection signal. In the reception mode, a second path in which the antenna, the fourth switch circuit, the variable gain low noise amplifier, the third switch circuit, the variable gain phase shifter, the second switch circuit and the first switch circuit are sequentially connected may be enabled based on the mode selection signal.

In some example embodiments, the beam-forming circuit may further include a first switch embedded impedance matching circuit, a second switch embedded impedance matching circuit and a third switch embedded impedance matching circuit. The first switch embedded impedance matching circuit may be disposed between the multi mode power amplifier, the first switch circuit and the variable gain phase shifter. The second switch embedded impedance matching circuit may be disposed between the variable gain low noise amplifier, the first switch circuit and the variable gain phase shifter. The third switch embedded impedance matching circuit may be disposed between the multi mode power amplifier, the variable gain low noise amplifier and the antenna.

In some example embodiments, the first switch embedded impedance matching circuit may include a first transmission line, a second transmission line, a third transmission line and a first switching element. The first transmission line may be connected to an input terminal of the multi mode power amplifier. The second transmission line may be connected to a first terminal of the first switch circuit. The third transmission line may be connected to an output terminal of the variable gain phase shifter. The first switching element may be connected in parallel with the first transmission line to the input terminal of the multi mode power amplifier.

In some example embodiments, in the transmission mode, the first switching element may be opened, and the first RF intermediate signal output from the variable gain phase shifter may be provided to the multi mode power amplifier via the first, second and third transmission lines. In the reception mode, the first switching element may be shorted, and the second RF output signal output from the variable gain phase shifter may be provided to the first switch circuit via the second and third transmission lines.

In some example embodiments, the second switch embedded impedance matching circuit may include a fourth transmission line, a fifth transmission line, a sixth transmission line and a second switching element. The fourth transmission line may be connected to an output terminal of the variable gain low noise amplifier. The fifth transmission line may be connected to a second terminal of the first switch circuit. The sixth transmission line may be connected to an input terminal of the variable gain phase shifter. The second switching element may be connected in parallel with the fourth transmission line to the output terminal of the variable gain low noise amplifier.

In some example embodiments, in the transmission mode, the second switching element may be shorted, and the first RF input signal received from the first switch circuit may be provided to the variable gain phase shifter via the fifth and sixth transmission lines. In the reception mode, the second switching element may be opened, and the second RF intermediate signal output from the variable gain low noise amplifier may be provided to the variable gain phase shifter via the fourth, fifth and sixth transmission lines.

In some example embodiments, the third switch embedded impedance matching circuit may include a seventh transmission line, an eighth transmission line, a ninth transmission line, a third switching element and a fourth switching element. The seventh transmission line may be connected to an output terminal of the multi mode power amplifier. The eighth transmission line may be connected to the antenna. The ninth transmission line may be connected to an input terminal of the variable gain low noise amplifier. The third switching element may be connected in parallel with the seventh transmission line to the output terminal of the multi mode power amplifier. The fourth switching element may be connected in parallel with the ninth transmission line to the input terminal of the variable gain low noise amplifier.

In some example embodiments, in the transmission mode, the third switching element may be opened, the fourth switching element may be shorted, and the first RF output signal output from the multi mode power amplifier may be provided to the antenna via the seventh and eighth transmission lines. In the reception mode, the third switching element may be shorted, the fourth switching element may be opened, and the second RF input signal received from the antenna may be provided to the variable gain low noise amplifier via the eighth and ninth transmission lines.

In some example embodiments, when the first transmission gain adjustment function is performed, a gain of the first RF output signal with respect to the first RF input signal may be controlled by a first unit. When the second transmission gain adjustment function is performed, the gain of the first RF output signal with respect to the first RF input signal may be controlled by a second unit smaller than the first unit.

In some example embodiments, when the first reception gain adjustment function is performed, a gain of the second RF output signal with respect to the second RF input signal may be controlled by a third unit in a first gain region. When the second reception gain adjustment function is performed, the gain of the second RF output signal with respect to the second RF input signal may be controlled by the second unit in a second gain region different from the first gain region.

In some example embodiments, an amplification mode of the multi mode power amplifier may be changed based on the first control signal.

In some example embodiments, the variable gain low noise amplifier may further perform a phase change compensation function based on the second control signal.

In some example embodiments, the variable gain phase shifter may control the gain and the phase of the first RF input signal at one time or may control the gain and the phase of the second RF intermediate signal at one time by adjusting magnitudes and directions of at least two in-phase vectors and at least two quadrature vectors based on the third control signal and by summing the at least two in-phase vectors and the at least two quadrature vectors.

According to example embodiments, a beam-forming circuit includes a multi mode power amplifier, a variable gain low noise amplifier, a first variable gain phase shifter, a second variable gain phase shifter, a first switch circuit and a second switch circuit. The multi mode power amplifier amplifies a first radio frequency (RF) intermediate signal generated based on a first RF input signal to generate a first RF output signal to be transmitted via an antenna in a transmission mode, and performs a first transmission gain adjustment function based on a first control signal in the transmission mode. The variable gain low noise amplifier amplifies a second RF input signal received via the antenna to generate a second RF intermediate signal in a reception mode, and performs a first reception gain adjustment function based on a second control signal in the reception mode. The first variable gain phase shifter controls a gain and a phase of the first RF input signal at one time to generate the first RF intermediate signal in the transmission mode, and performs a second transmission gain adjustment function and a transmission phase adjustment function at one time based on a third control signal in the transmission mode. The second variable gain phase shifter controls a gain and a phase of the second RF intermediate signal at one time to generate a second RF output signal in the reception mode, and performs a second reception gain adjustment function and a reception phase adjustment function at one time based on a fourth control signal in the reception mode. The first switch circuit provides the first RF input signal to the first variable gain phase shifter in the transmission mode, and receives the second RF output signal from the second variable gain phase shifter to output the second RF output signal in the reception mode. The second switch circuit provides the first RF output signal to the antenna in the transmission mode, and provides the second RF input signal to the variable gain low noise amplifier in the reception mode.

In some example embodiments, in the transmission mode, a first path in which the first switch circuit, the first variable gain phase shifter, the multi mode power amplifier, the second switch circuit and the antenna are sequentially connected may be enabled based on a mode selection signal. In the reception mode, a second path in which the antenna, the second switch circuit, the variable gain low noise amplifier, the second variable gain phase shifter and the first switch circuit are sequentially connected may be enabled based on the mode selection signal.

In some example embodiments, when the first transmission gain adjustment function is performed, a gain of the first RF output signal with respect to the first RF input signal may be controlled by a first unit. When the second transmission gain adjustment function is performed, the gain of the first RF output signal with respect to the first RF input signal may be controlled by a second unit smaller than the first unit.

In some example embodiments, when the first reception gain adjustment function is performed, a gain of the second RF output signal with respect to the second RF input signal may be controlled by a third unit in a first gain region. When the second reception gain adjustment function is performed, the gain of the second RF output signal with respect to the second RF input signal may be controlled by the second unit in a second gain region different from the first gain region.

In some example embodiments, when the second reception gain adjustment function is performed, a gain of the second RF output signal with respect to the second RF input signal may be controlled by a third unit. When the first reception gain adjustment function is performed, the gain of the second RF output signal with respect to the second RF input signal may be controlled by a fourth unit smaller than the third unit.

Accordingly, the beam-forming circuit according to example embodiments may include the variable gain phase shifter that independently controls the phase and gain of the signal at one time. By including the variable gain phase shifter, a VGA or an attenuator may be removed or omitted in the beam-forming circuit, and thus the size, area and power consumption may be reduced. By using the variable gain phase shifter, the insertion loss may be reduced and the phase error due to the gain variation may be minimized. In addition, one variable gain phase shifter may be shared by the transmission path and the reception path, and thus the size, area and power consumption may be further reduced. Additionally, by implementing the switch circuits integrated in the impedance matching circuits, the size and area may be further reduced.

The beam-forming circuit according to example embodiments may distribute the transmission gain adjustment function using the multi mode power amplifier and the variable gain phase shifter. Thus, a dynamic range of the transmission gain adjustment of the beam-forming circuit may be increased. In addition, when the multi mode power amplifier is implemented to have a plurality of gain modes or amplification modes, the efficiency may be increased at relatively low power and at a region having relatively low gain, and an active inter-stage matching stage may be applied to improve the linearity.

The beam-forming circuit according to example embodiments may distribute the reception gain adjustment function using the variable gain low noise amplifier and the variable gain phase shifter. Thus, a dynamic range of the reception gain adjustment and a resolution of the beam-forming circuit may be increased. In addition, the variable gain low noise amplifier may further perform the phase change compensation function, and thus the phase error may be further reduced.

BRIEF DESCRIPTION OF THE DRAWINGS

FIGS. 5A, 5B, 5C, 6A, 6B, 6C and 6D are diagrams for describing an operation of a variable gain phase shifter included in a beam-forming circuit according to example embodiments.

DETAILED DESCRIPTION OF THE EMBODIMENTS

Figure 1:
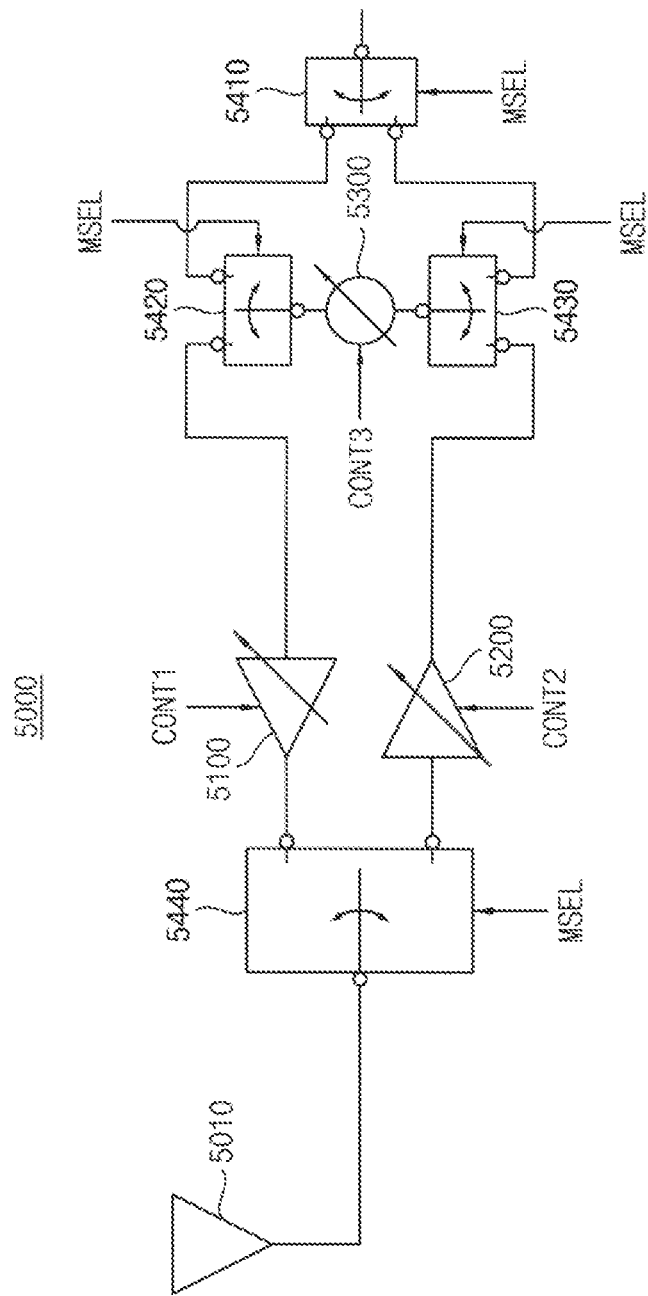
FIG. 1 is a block diagram illustrating a beam-forming circuit according to example embodiments.

Various example embodiments will be described more fully with reference to the accompanying drawings, in which embodiments are shown. This inventive concept may, however, be embodied in many different forms and should not be construed as limited to the embodiments set forth herein.

Rather, these embodiments are provided so that this disclosure will be thorough and complete, and will fully convey the scope of the inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The above and other features of the inventive concept will become more apparent by describing in detail example embodiments thereof with reference to the accompanying drawings. The same reference numerals are used for the same elements in the drawings and redundant explanations for the same elements are omitted.

Figure 2A:
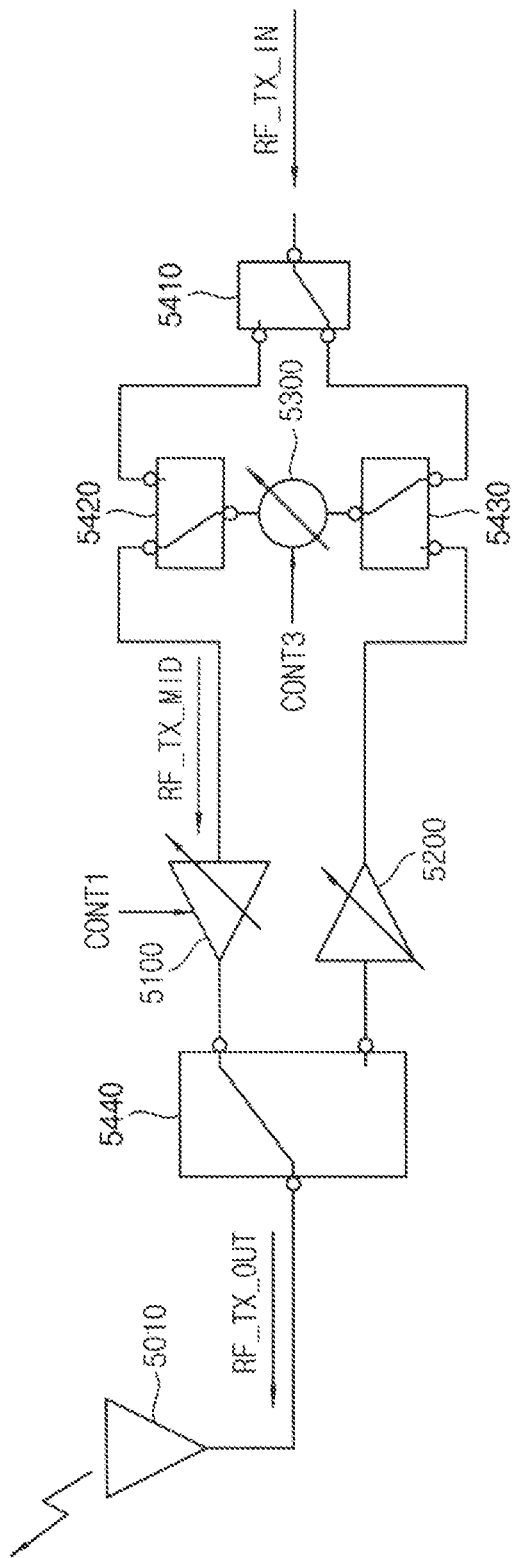
FIGS. 2A and 2B are diagrams for describing an operation of the beam-forming circuit of FIG. 1 in a transmission mode and a reception mode.
Figure 2B:
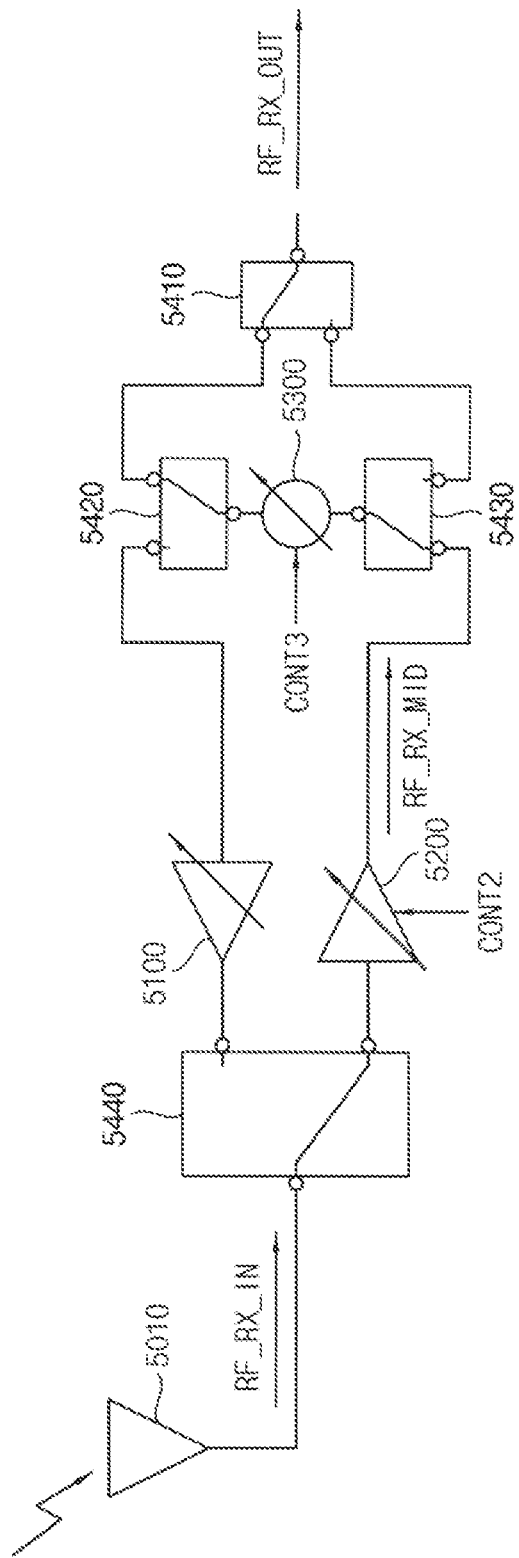

FIG. 1 is a block diagram illustrating a beam-forming circuit according to example embodiments. FIGS. 2A and 2B are diagrams for describing an operation of the beam-forming circuit of FIG. 1 in a transmission mode and a reception mode.

Referring to FIG. 1, a beam-forming circuit 5000 includes a multi mode power amplifier (MM-PA) 5100, a variable gain low noise amplifier (VG-LNA) 5200, a variable gain phase shifter (VG-PS) 5300 and a first switch circuit 5410. The beam-forming circuit 5000 may further include a second switch circuit 5420, a third switch circuit 5430 and a fourth switch circuit 5440.

The multi mode power amplifier 5100 amplifies a transmission signal to be transmitted via an antenna 5010 in a transmission mode, and performs a first transmission gain adjustment (or gain control) function for the transmission signal based on a first control signal CONT1 in the transmission mode. As will be described with reference to FIGS. 4A and 4B, an amplification mode of the multi mode power amplifier 5100 may be changed based on the first control signal CONT1.

The variable gain low noise amplifier 5200 amplifies a reception signal received via the antenna 5010 in a reception mode, and performs a first reception gain adjustment function for the reception signal based on a second control signal CONT2 in the reception mode. As will be described with reference to FIGS. 8 and 9, the variable gain low noise amplifier 5200 may further perform a phase change compensation function based on the second control signal CONT2.

The variable gain phase shifter 5300 independently performs a second transmission gain adjustment function and a transmission phase adjustment (or phase control) function for the transmission signal at one time (or at the same time or simultaneously) based on a third control signal CONT3 in the transmission mode, and independently performs a second reception gain adjustment function and a reception phase adjustment function for the reception signal at one time based on the third control signal CONT3 in the reception mode. The variable gain phase shifter 5300 may be used in both the transmission mode and the reception mode. Detailed operations of the variable gain phase shifter 5300 will be described with reference to FIGS. 5A, 5B, 5C, 6A, 6B, 6C and 6D.

The first switch circuit 5410 includes a first terminal receiving a first radio frequency (RF) input signal RF_TX_IN or outputting a second RF output signal RF_RX_OUT, a second terminal connected to a third terminal of the second switch circuit 5420, and a third terminal connected to a third terminal of the third switch circuit 5430. The second switch circuit 5420 includes a first terminal connected to an output terminal of the variable gain phase shifter 5300, a second terminal connected to an input terminal of the multi mode power amplifier 5100, and the third terminal connected to the second terminal of the first switch circuit 5410. The third switch circuit 5430 includes a first terminal connected to an input terminal of the variable gain phase shifter 5300, a second terminal connected to an output terminal of the variable gain low noise amplifier 5200, and the third terminal connected to the third terminal of the first switch circuit 5410. The fourth switch circuit 5440 includes a first terminal connected to the antenna 5010, a second terminal connected to an output terminal of the multi mode power amplifier 5100, and the third terminal connected to an input terminal of the variable gain low noise amplifier 5200. For example, each of the first, second, third and fourth switch circuits 5410, 5420, 5430 and 5440 may be implemented in a form of a single pole double throw (SPDT) switch that electrically connects one of the second and third terminals (or ports) with the first terminal (or port).

An electrical connection state of each of the first, second, third and fourth switch circuits 5410, 5420, 5430 and 5440 may be controlled based on a mode selection signal MSEL. The first switch circuit 5410 may be electrically connected to receive the first RF input signal RF_TX_IN or output the second RF output signal RF_RX_OUT based on the mode selection signal MSEL. The second switch circuit 5420 may electrically connect one of the multi mode power amplifier 5100 and the first switch circuit 5410 with the variable gain phase shifter 5300 based on the mode selection signal MSEL. The third switch circuit 5430 may electrically connect one of the variable gain low noise amplifier 5200 and the first switch circuit 5410 with the variable gain phase shifter 5300 based on the mode selection signal MSEL. The fourth switch circuit 5440 may electrically connect one of the multi mode power amplifier 5100 and the variable gain low noise amplifier 5200 with the antenna 5010 based on the mode selection signal MSEL.

Referring to FIG. 2A, in the transmission mode, the first and third terminals of the first switch circuit 5410 may be electrically connected to each other, the first and second terminals of the second switch circuit 5420 may be electrically connected to each other, the first and third terminals of the third switch circuit 5430 may be electrically connected to each other, and the first and second terminals of the fourth switch circuit 5440 may be electrically connected to each other, based on the mode selection signal MSEL. Thus, a first path in which the first switch circuit 5410, the third switch circuit 5430, the variable gain phase shifter 5300, the second switch circuit 5420, the multi mode power amplifier 5100, the fourth switch circuit 5440 and the antenna 5010 are sequentially connected may be enabled. The first path may be referred to as a transmission path.

The first switch circuit 5410 receives the first RF input signal RF_TX_IN from an outside (e.g., from an external signal processor). The first RF input signal RF_TX_IN is provided to the variable gain phase shifter 5300 via the third switch circuit 5430. The variable gain phase shifter 5300 controls a gain and a phase of the first RF input signal RF_TX_IN at one time based on the third control signal CONT3 to generate a first RF intermediate signal RF_TX_MID. The first RF intermediate signal RF_TX_MID is provided to the multi mode power amplifier 5100 via the second switch circuit 5420. The multi mode power amplifier 5100 amplifies the first RF intermediate signal RF_TX_MID based on the first control signal CONT1 to generate a first RF output signal RF_TX_OUT. The first RF output signal RF_TX_OUT is provided to the antenna 5010 via the fourth switch circuit 5440, and is transmitted to an outside (e.g., to an external communication terminal) via the antenna 5010.

In the transmission mode, the multi mode power amplifier 5100 performs the first transmission gain adjustment function based on the first control signal CONT1, and the variable gain phase shifter 5300 performs the second transmission gain adjustment function and the transmission phase adjustment function at one time based on the third control signal CONT3. In other words, the gain adjustment function (or gain control function) may be distributed or spread in the transmission mode using the multi mode power amplifier 5100 and the variable gain phase shifter 5300.

Referring to FIG. 2B, in the reception mode, the first and second terminals of the first switch circuit 5410 may be electrically connected to each other, the first and third terminals of the second switch circuit 5420 may be electrically connected to each other, the first and second terminals of the third switch circuit 5430 may be electrically connected to each other, and the first and third terminals of the fourth switch circuit 5440 may be electrically connected to each other, based on the mode selection signal MSEL. Thus, a second path in which the antenna 5010, the fourth switch circuit 5440, the variable gain low noise amplifier 5200, the third switch circuit 5430, the variable gain phase shifter 5300, the second switch circuit 5420 and the first switch circuit 5410 are sequentially connected may be enabled. The second path may be referred to as a reception path.

The antenna 5010 receives a second RF input signal RF_RX_IN from the outside (e.g., from the external communication terminal). The second RF input signal RF_RX_IN is provided to the variable gain low noise amplifier 5200 via the fourth switch circuit 5440. The variable gain low noise amplifier 5200 amplifies the second RF input signal RF_RX_IN based on the second control signal CONT2 to generate a second RF intermediate signal RF_RX_MID. The second RF intermediate signal RF_RX_MID is provided to the variable gain phase shifter 5300 via the third switch circuit 5430. The variable gain phase shifter 5300 controls a gain and a phase of the second RF intermediate signal RF_RX_MID at one time based on the third control signal CONT3 to generate the second RF output signal RF_RX_OUT. The second RF output signal RF_RX_OUT is output via the second switch circuit 5420 and the first switch circuit 5410, and is provided to the outside (e.g., to the external signal processor).

In the reception mode, the variable gain low noise amplifier 5200 performs the first reception gain adjustment function based on the second control signal CONT2, and the variable gain phase shifter 5300 performs the second reception gain adjustment function and the reception phase adjustment function at one time based on the third control signal CONT3. In other words, the gain adjustment function may be distributed or spread in the reception mode using the variable gain low noise amplifier 5200 and the variable gain phase shifter 5300. In addition, the variable gain low noise amplifier 5200 may further perform the phase change compensation function based on the second control signal CONT2.

In a conventional beam-forming circuit, a transmission path includes a power amplifier, a phase shifter for phase adjustment, and a variable gain amplifier (VGA) or an attenuator for gain adjustment, and further includes an amplifier for loss compensation. Similarly, a reception path includes a low noise amplifier, a phase shifter, and a VGA or an attenuator, and further includes an amplifier for loss compensation. The conventional beam-forming circuit also includes two switches for enabling one of the transmission path and the reception path. In other words, the conventional beam-forming circuit is implemented to include at least ten individual and different blocks, and thus there is a problem in that the size, area and power consumption are relatively large.

The beam-forming circuit 5000 according to example embodiments may include the variable gain phase shifter 5300 that independently controls the phase and gain of the signal at one time. By including the variable gain phase shifter 5300, a VGA or an attenuator may be removed or omitted in the beam-forming circuit 5000, and thus the size, area and power consumption may be reduced. In addition, one variable gain phase shifter 5300 may be shared by the transmission path and the reception path, and thus the size, area and power consumption may be further reduced. By using the variable gain phase shifter 5300, the phase error due to the gain variation may be minimized.

The beam-forming circuit 5000 according to example embodiments may distribute the transmission gain adjustment function using the multi mode power amplifier 5100 and the variable gain phase shifter 5300 that are included in the transmission path. Thus, a dynamic range of the transmission gain adjustment of the beam-forming circuit 5000 may be increased as compared with the conventional beam-forming circuit that controls the gain using only the power amplifier. In addition, when the multi mode power amplifier 5100 is implemented to have a plurality of gain modes or amplification modes, the efficiency (e.g., amplification efficiency) may be increased at relatively low power and at a region having relatively low gain, and an active inter-stage matching stage may be applied to improve the linearity.

The beam-forming circuit 5000 according to example embodiments may distribute the reception gain adjustment function using the variable gain low noise amplifier 5200 and the variable gain phase shifter 5300 that are included in the reception path. Thus, a dynamic range of the reception gain adjustment of the beam-forming circuit 5000 may be increased as compared with the conventional beam-forming circuit that controls the gain using only the low noise amplifier. In addition, the variable gain low noise amplifier 5200 may further perform the phase change compensation function, and thus the phase error may be further reduced.

Figure 3:
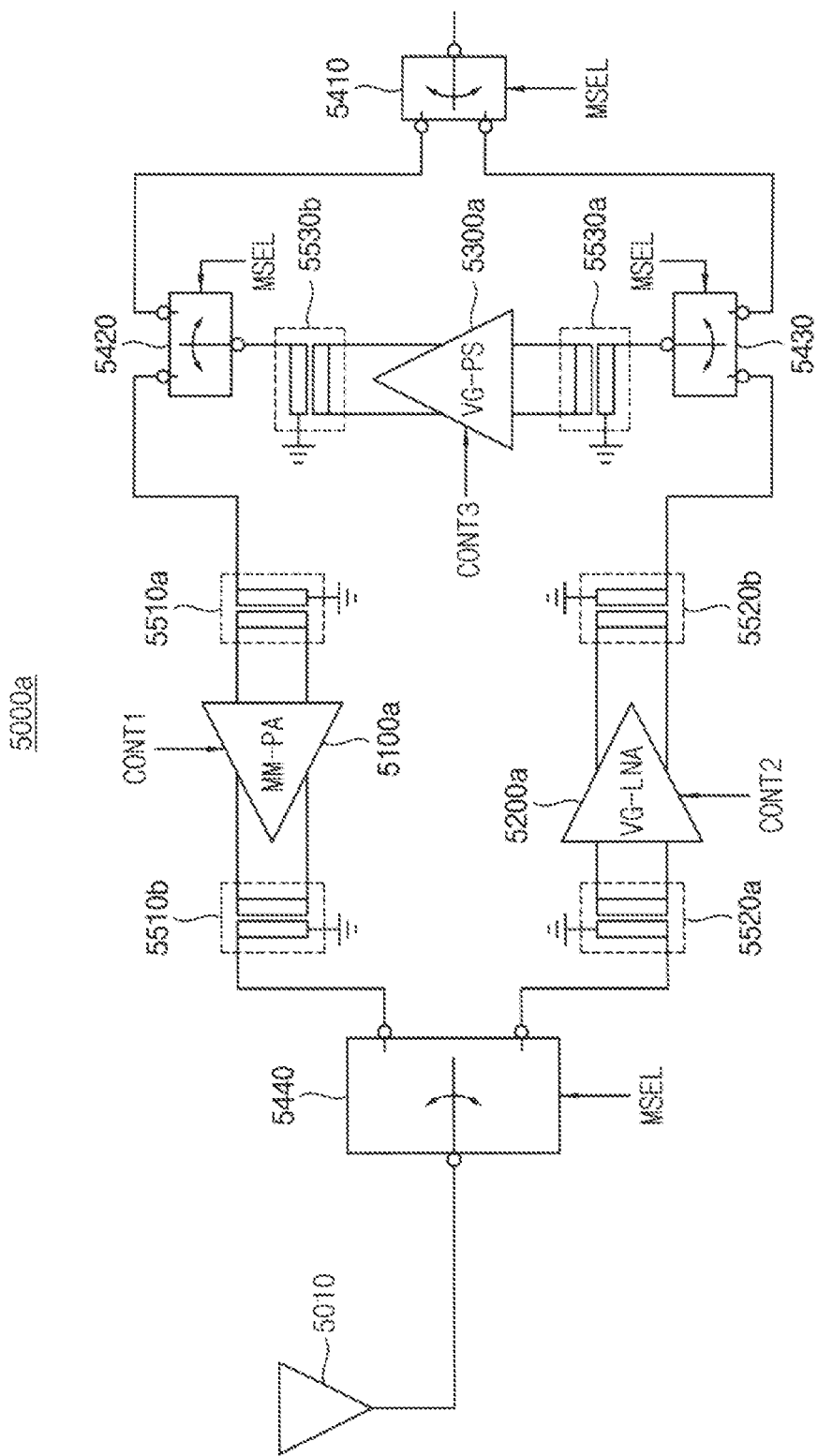
FIG. 3 is a block diagram illustrating a beam-forming circuit according to example embodiments.

FIG. 3 is a block diagram illustrating a beam-forming circuit according to example embodiments.

Referring to FIG. 3, a beam-forming circuit 5000a includes a multi mode power amplifier 5100a, a variable gain low noise amplifier 5200a, a variable gain phase shifter 5300a and a first switch circuit 5410. The beam-forming circuit 5000a may further include a second switch circuit 5420, a third switch circuit 5430, a fourth switch circuit 5440, a first impedance matching circuit 5510a, a second first impedance matching circuit 5510b, a third impedance matching circuit 5520a, a fourth first impedance matching circuit 5520b, a fifth impedance matching circuit 5530a and a sixth first impedance matching circuit 5530b.

The multi mode power amplifier 5100a, the variable gain low noise amplifier 5200a and the variable gain phase shifter 5300a in FIG. 3 may be substantially the same as the multi mode power amplifier 5100, the variable gain low noise amplifier 5200 and the variable gain phase shifter 5300 in FIG. 1, respectively, except that each of the multi mode power amplifier 5100a, the variable gain low noise amplifier 5200a and the variable gain phase shifter 5300a is implemented in a differential type. Thus, each of the first RF input signal RF_TX_IN, the first RF intermediate signal RF_TX_MID, the first RF output signal RF_TX_OUT, the second RF input signal RF_RX_IN, the second RF intermediate signal RF_RX_MID and the second RF output signal RF_RX_OUT in an example of FIG. 3 may be a pair of differential signals. The first, second, third and fourth switch circuits 5410, 5420, 5430 and 5440 in FIG. 3 may be substantially the same as the first, second, third and fourth switch circuits 5410, 5420, 5430 and 5440 in FIG. 1, respectively.

The first impedance matching circuit 5510a may be connected to input terminals (e.g., two input terminals) of the multi mode power amplifier 5100a. The second impedance matching circuit 5510b may be connected to output terminals (e.g., two output terminals) of the multi mode power amplifier 5100a. The third impedance matching circuit 5520a may be connected to input terminals (e.g., two input terminals) of the variable gain low noise amplifier 5200a. The fourth impedance matching circuit 5520b may be connected to output terminals (e.g., two output terminals) of the variable gain low noise amplifier 5200a. The fifth impedance matching circuit 5530a may be connected to input terminals (e.g., two input terminals) of the variable gain phase shifter 5300a. The sixth impedance matching circuit 5530b may be connected to output terminals (e.g., two output terminals) of the variable gain phase shifter 5300a. For example, each of the first, second, third, fourth, fifth and sixth impedance matching circuits 5510a, 5510b, 5520a, 5520b, 5530a and 5530b may include a transmission line transformer (TLT) that includes two transmission lines (or wirings) arranged in parallel, and may act or serve as a balanced-to-unbalanced (BALUN) and an impedance matching network.

The first impedance matching circuit 5510a and the second impedance matching circuit 5510b may be referred to as an input impedance matching circuit and an output impedance matching circuit for the multi mode power amplifier 5100a, respectively. The third impedance matching circuit 5520a and the fourth impedance matching circuit 5520b may be referred to as an input impedance matching circuit and an output impedance matching circuit for the variable gain low noise amplifier 5200a, respectively. The fifth impedance matching circuit 5530a and the sixth impedance matching circuit 5530b may be referred to as an input impedance matching circuit and an output impedance matching circuit for the variable gain phase shifter 5300a, respectively.

Figure 4A:
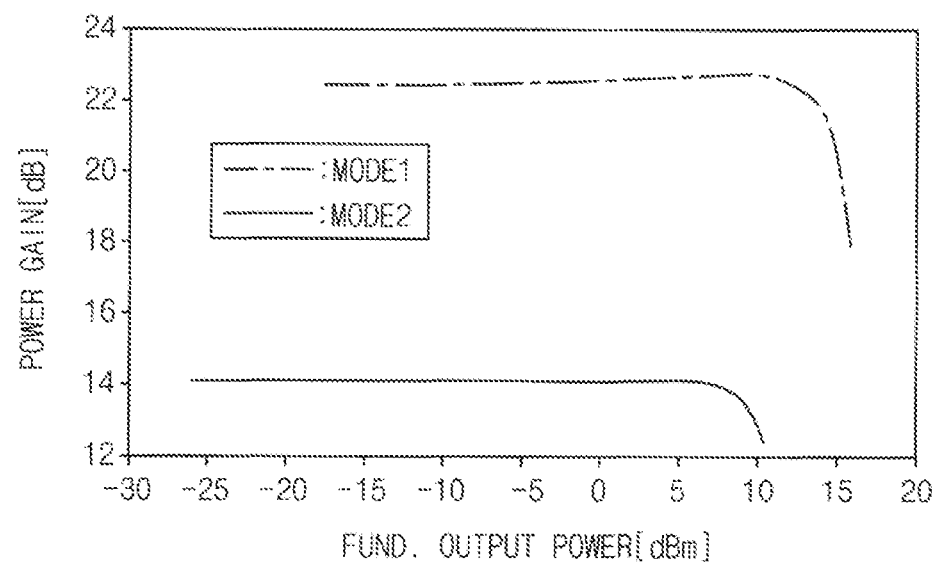
FIGS. 4A and 4B are diagrams for describing an operation of a multi mode power amplifier included in a beam-forming circuit according to example embodiments.
Figure 4B:
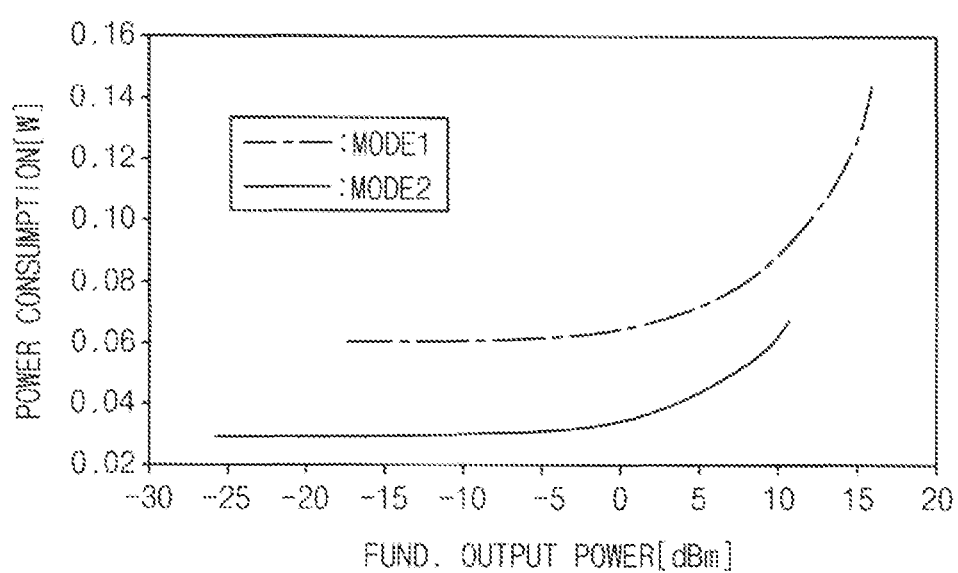

FIGS. 4A and 4B are diagrams for describing an operation of a multi mode power amplifier included in a beam-forming circuit according to example embodiments.

Referring to FIGS. 1, 3 and 4A, the amplification mode of the multi mode power amplifier 5100 or 5100a may be changed based on the first control signal CONT1. In an example of FIG. 4A, it may be shown that a gain difference of about 8 dB exists between a first amplification mode MODE1 and a second amplification mode MODE2.

In some example embodiments, the multi mode power amplifier 5100 or 5100a may include two amplification stages that are connected in parallel, and the amplification mode may be changed in such a manner that only one of the two amplification stages is activated or both of the two amplification stages are activated.

Referring to FIGS. 1, 3 and 4B, in an example where the multi mode power amplifier 5100 or 5100a operates in the first amplification mode MODE1, it may be shown that the power of about 60 mW is consumed when the gain of about 10 dB is reduced in a linear region (e.g., a region at about 0 dB). In addition, in an example where the multi mode power amplifier 5100 or 5100a operates in the second amplification mode MODE2, it may be shown that the power consumption is reduced by about a half under the same conditions, which means that the power of about 30 mW is consumed.

From this, it may be checked that it is difficult to ensure both the desired dynamic range and power efficiency when all gain adjustment are performed by only power amplifier. When compared with the conventional power amplifier operating only in a single mode (e.g., the first amplification mode MODE1), the multi mode power amplifier 5100 or 5100a included in the beam-forming circuit 5000 or 5000a according to example embodiments may have a relatively wide dynamic range, and the efficiency may be increased at relatively low power and at a region having relatively low gain using the multi mode function.

Although an example where the multi mode power amplifier 5100 or 5100a operates in one of the two amplification modes MODE1 and MODE2 is described with reference to FIGS. 4A and 4B, example embodiments are not limited thereto. For example, the multi mode power amplifier may operate in one of three or more amplification modes.

FIGS. 5A, 5B, 5C, 6A, 6B, 6C and 6D are diagrams for describing an operation of a variable gain phase shifter included in a beam-forming circuit according to example embodiments.

Figure 5A:
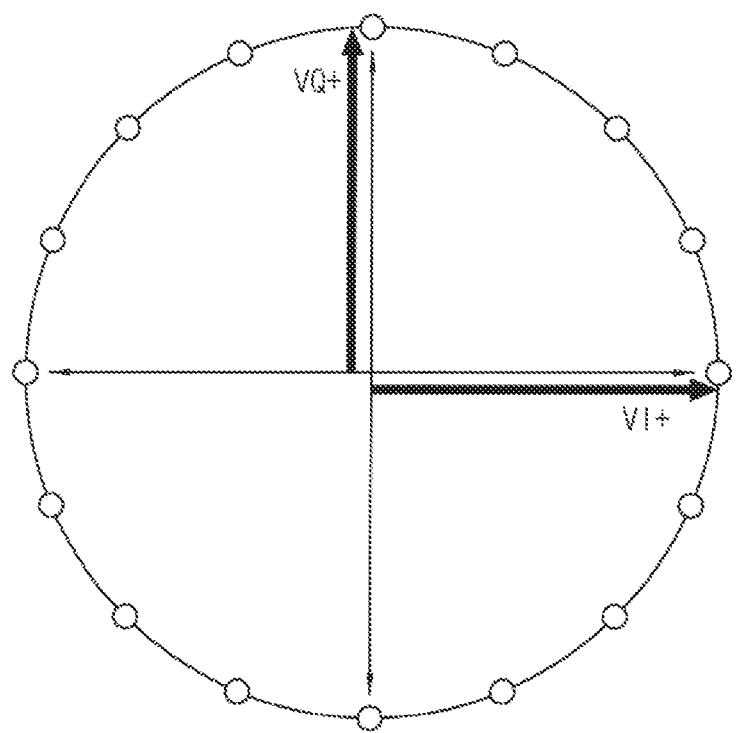

Referring to FIG. 5A, in a conventional phase shifter, an output signal is generated by adjusting or controlling magnitudes and directions of one in-phase vector VI+ and one quadrature vector VQ+ and by summing the one in-phase vector VI+ and the one quadrature vector VQ+. In this case, it is effective for the phase adjustment, however, there is a problem in that it is difficult to perform the gain adjustment. In other words, a gain circle (e.g., a relatively large circle illustrated by a solid line) in FIG. 5A is fixed in the conventional phase shifter.

Referring to FIGS. 1, 3, 5B and 5C, in the variable gain phase shifter 5300 or 5300a included in the beam-forming circuit 5000 or 5000a according to example embodiments, an output signal may be generated by adjusting or controlling magnitudes and directions of at least two in-phase vectors and at least two quadrature vectors based on the third control signal CONT3 and by summing the at least two in-phase vectors and the at least two quadrature vectors. Thus, the phase and gain of the signal may be independently and efficiently adjusted or controlled at one time using one element or block.

Figure 5B:
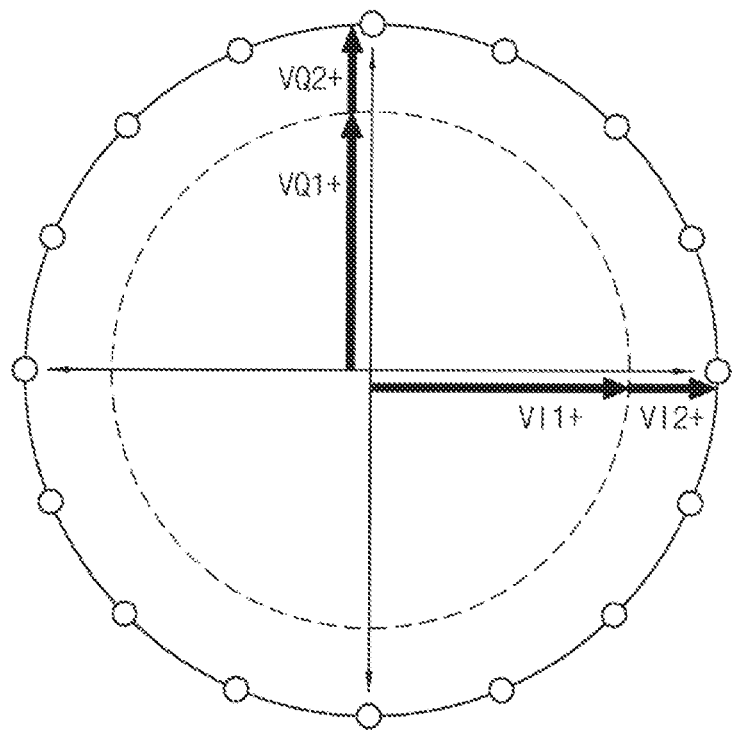
Figure 5C:
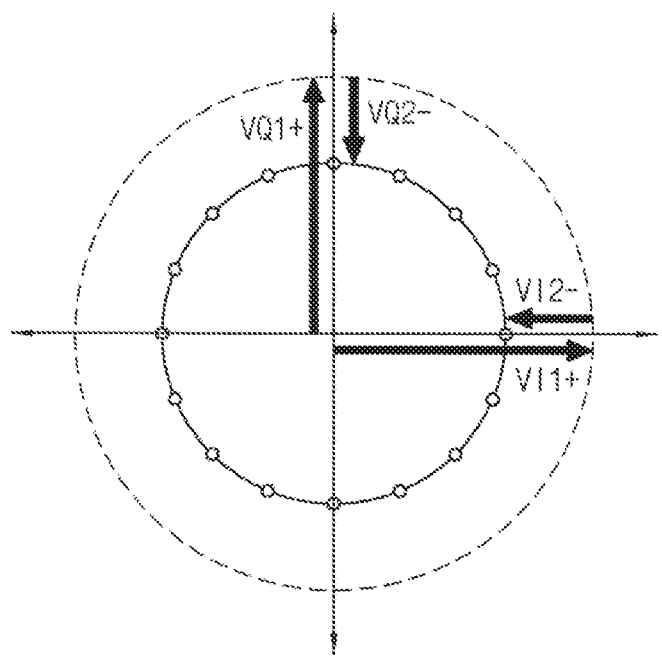

For example, as illustrated in FIG. 5B, all of first and second in-phase vectors VI1+ and VI2+ and first and second quadrature vectors VQ1+ and VQ2+ may be set to positive vectors, the first and second in-phase vectors VI1+ and VI2+ and the first and second quadrature vectors VQ1+ and VQ2+ may be summed, and thus an output signal may be obtained. For another example, as illustrated in FIG. 5C, a first in-phase vector VI1+ and a first quadrature vector VQ1+ may be set to positive vectors, a second in-phase vector VI2− and a second quadrature vector VQ2− may be set to negative vectors, the first and second in-phase vectors VI1+ and VI2− and the first and second quadrature vectors VQ1+ and VQ2− may be summed, and thus an output signal may be obtained. When compared with a gain circle (e.g., a relatively large circle illustrated by a solid line) in FIG. 5B, it may be shown that a gain circle (e.g., a relatively large circle illustrated by a solid line) in FIG. 5C is decreased, and thus it may be checked that the gain is reduced in FIG. 5C.

As described above, the phase of the output signal may be adjusted or controlled in a first quadrant by adjusting or controlling the magnitudes of the vectors VI1+, VI2+, VQ1+ and VQ2+ in FIG. 5B or the vectors VI1+, VI2−, VQ1+ and VQ2− in FIG. 5C. Although not illustrated in FIGS. 5B and 5C, the phase of the output signal may be adjusted or controlled in a second, third or fourth quadrant by setting the directions of the vectors differently. Although examples where the output signal is generated or obtained based on two in-phase vectors and two quadrature vectors are described with reference to FIGS. 5B and 5C, example embodiments are not limited thereto. For example, the output signal may be generated or obtained based on three or more in-phase vectors and three or more quadrature vectors.

To perform the operation described with reference to FIG. 5A, the conventional phase shifter includes a vector summation circuit that includes one vector summation cell and two current control circuits connected thereto. The directions of the vectors (e.g., the vectors VI+ and VQ+ in FIG. 5A) are determined by the vector summation cell, the magnitudes of the vectors are adjusted or controlled by adjusting or controlling the amount (or ratio) of currents flowing through the vector summation cell by the current control circuits, and then the sum of the total currents flowing through the vector summation cell is always maintained in a constant.

To perform the operations described with reference to FIGS. 5B and 5C, the variable gain phase shifter 5300 or 5300a included in the beam-forming circuit 5000 or 5000a according to example embodiments may include a vector summation circuit whose structure is changed or modified as compared with the conventional vector summation circuit.

Figure 6A:
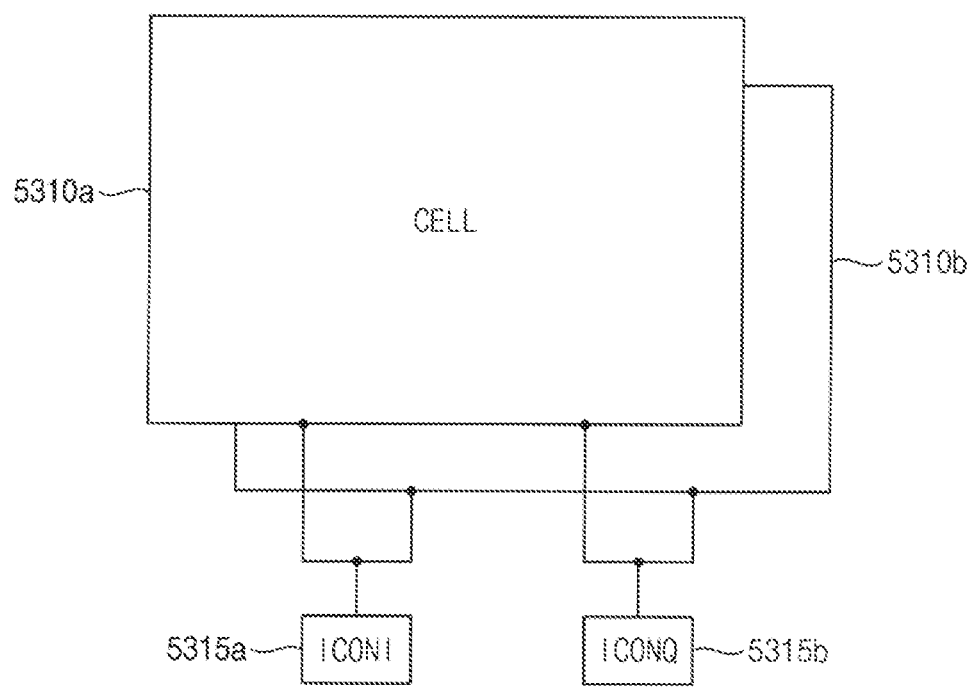

Referring to FIG. 6A, a first embodiment of the vector summation circuit included in the variable gain phase shifter 5300 or 5300a may include two vector summation cells 5310a and 5310b connected in common to an output terminal, and two current control circuits 5315a and 5315b connected thereto. A structure illustrated in FIG. 6A may be referred to as a cell separation structure.

The directions of the first in-phase vector and the first quadrature vector (e.g., the vectors VI1+ and VQ1+ in FIG. 5B) may be determined by the vector summation cell 5310a, and the directions of the second in-phase vector and the second quadrature vector (e.g., the vectors VI2+ and VQ2+ in FIG. 5B) may be determined by the vector summation cell 5310b. A magnitude ratio between the first and second in-phase vectors (or a magnitude ratio between the first and second quadrature vectors) may be determined by a size ratio of the vector summation cells 5310a and 5310b (e.g., a width/length (W/L) ratio of transistors included in the vector summation cells 5310a and 5310b). A magnitude ratio between the first in-phase vector and the first quadrature vector (or a magnitude ratio between the second in-phase vector and the second quadrature vector) may be determined by the current control circuits 5315a and 5315b. The sum of the total currents flowing through the vector summation cells 5310a and 5310b and the current control circuits 5315a and 5315b may always be maintained in a constant.

Figure 6B:
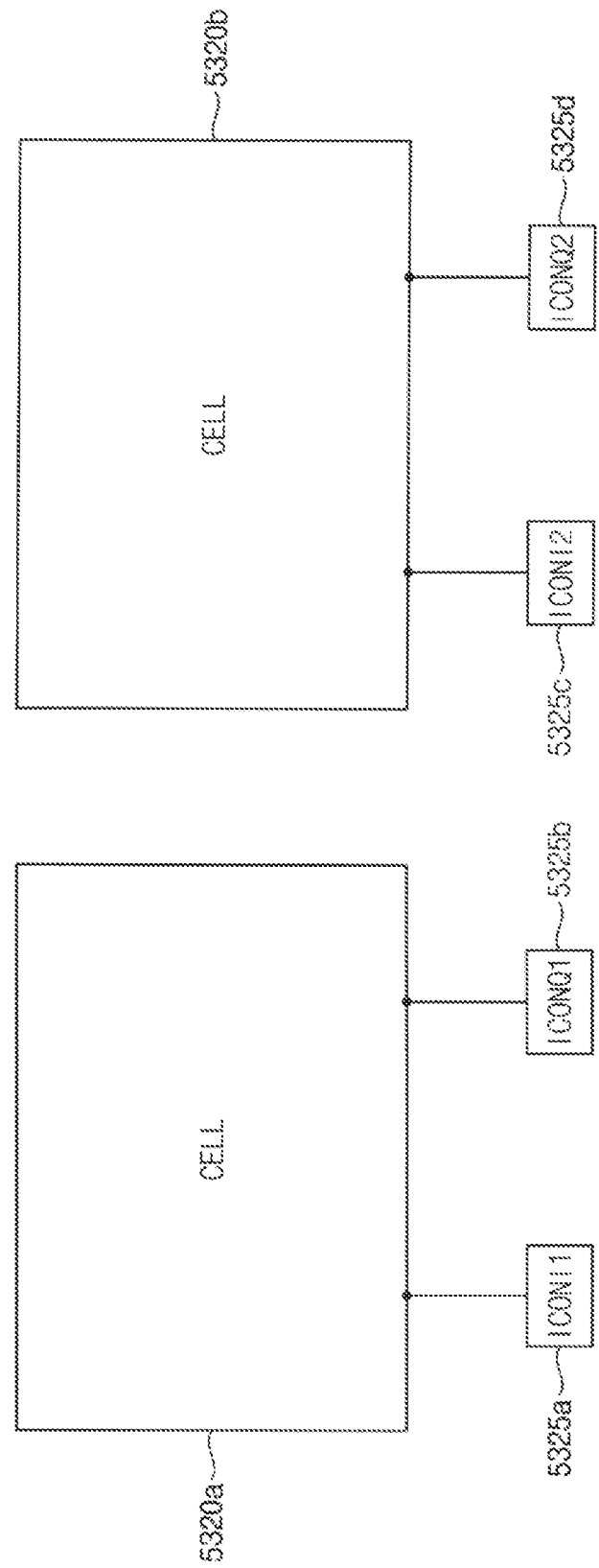

Referring to FIG. 6B, a second embodiment of the vector summation circuit included in the variable gain phase shifter 5300 or 5300a may include two vector summation cells 5320a and 5320b connected in common to an output terminal, and four current control circuits 5325a, 5325b, 5325c and 5325d connected thereto. The current control circuits 5325a and 5325b may be connected to the vector summation cell 5320a, and the current control circuits 5325c and 5325d may be connected to the vector summation cell 5320b. A structure illustrated in FIG. 6B may be referred to as a current separation structure.

The directions of the first in-phase vector and the first quadrature vector (e.g., the vectors VI1+ and VQ1+ in FIG. 5B) may be determined by the vector summation cell 5320a, and the directions of the second in-phase vector and the second quadrature vector (e.g., the vectors VI2+ and VQ2+ in FIG. 5B) may be determined by the vector summation cell 5320b. The magnitudes and ratio of the first in-phase vector and the first quadrature vector may be determined by the current control circuits 5325a and 5325b, and the magnitudes and ratio of the second in-phase vector and the second quadrature vector may be determined by the current control circuits 5325c and 5325d. The sum of the total currents flowing through the vector summation cells 5320a and 5320b and the current control circuits 5325a, 5325b, 5325c and 5325d may always be maintained in a constant.

Referring to FIG. 6C, a third embodiment of the vector summation circuit included in the variable gain phase shifter 5300 or 5300a may include four vector summation cells 5330a, 5330b, 5330c and 5330d connected in common to an output terminal, and four current control circuits 5335a, 5335b, 5335c and 5335d connected thereto. The current control circuits 5335a and 5335b may be shared by the vector summation cells 5330a and 5330b, and the current control circuits 5335c and 5335d may be shared by the vector summation cells 5330c and 5330d. A structure illustrated in FIG. 6C may be referred to as a hybrid structure in which the cell separation structure and the current separation structure are combined with each other.

A first circuit that includes the vector summation cells 5330a and 5330b and the current control circuits 5335a and 5335b may operate similarly to the first embodiment of FIG. 6A, and a second circuit that includes the vector summation cells 5330c and 5330d and the current control circuits 5335c and 5335d may also operate similarly to the first embodiment of FIG. 6A. The first and second circuits may operate similarly to the second embodiment of FIG. 6B. The sum of the total currents flowing through the vector summation cells 5330a, 5330b, 5330c and 5330d and the current control circuits 5335a, 5335b, 5335c and 5335d may always be maintained in a constant.

Figure 6D:
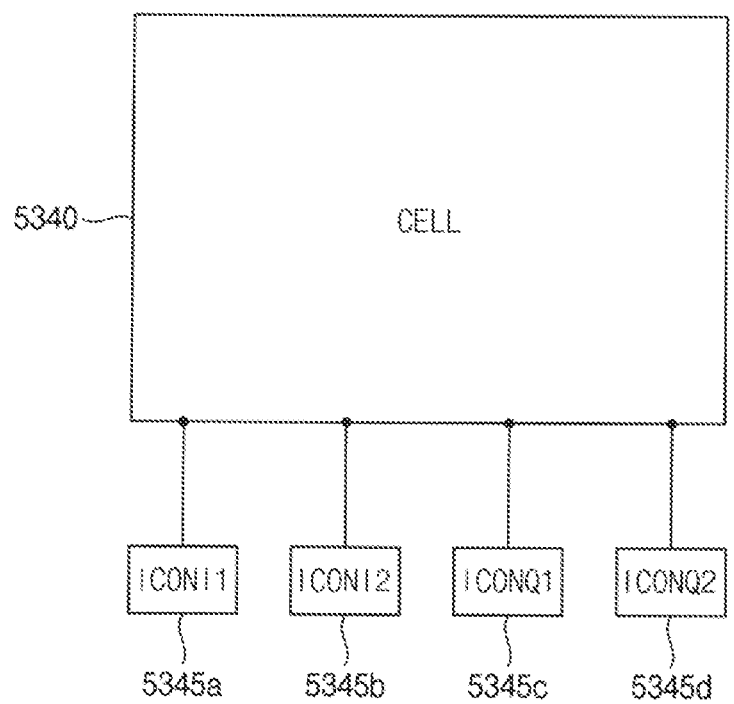

Referring to FIG. 6D, a fourth embodiment of the vector summation circuit included in the variable gain phase shifter 5300 or 5300*a* may include one vector summation cell 5340 connected to an output terminal, and four current control circuits 5345*a*, 5345*b*, 5345*c* and 5345*d* connected thereto.

The first and second in-phase vectors (e.g., the vectors VI1+ and VI2+ in FIG. 5B) and the first and second quadrature vectors (e.g., the vectors VQ1+ and VQ2+ in FIG. 5B) may be selected at one time using the one vector summation cell 5340. The magnitudes and ratio of the first and second in-phase vectors and the first and second quadrature vectors may be determined by the current control circuits 5345*a*, 5345*b*, 5345*c* and 5345*d*. The sum of the total currents flowing through the vector summation cell 5340 and the current control circuits 5345*a*, 5345*b*, 5345*c* and 5345*d* may always be maintained in a constant.

Figure 7:
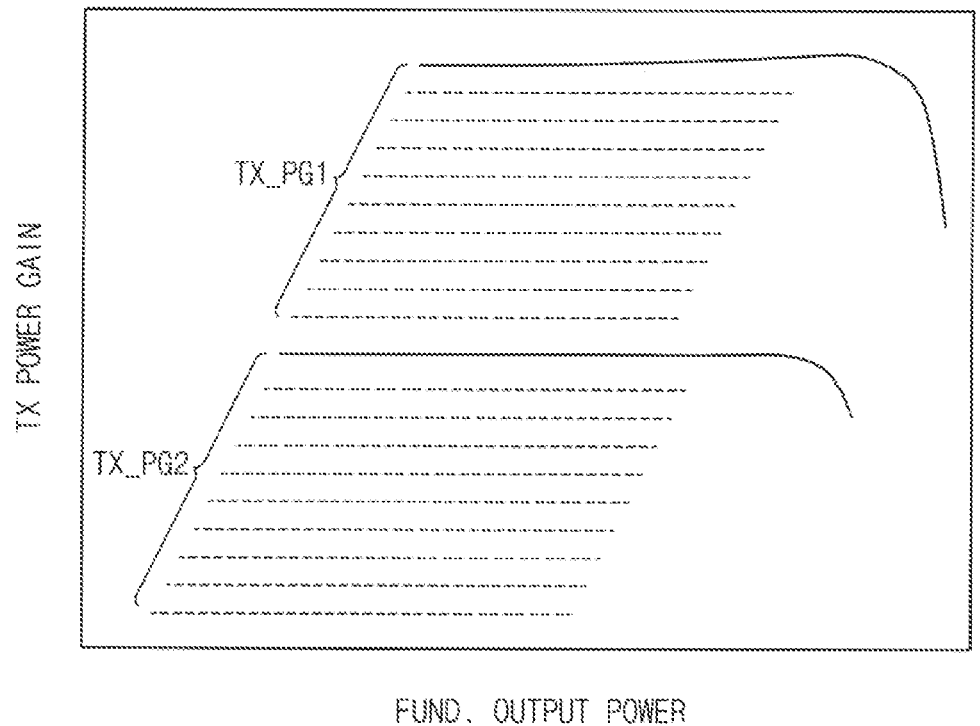
FIG. 7 is a diagram for describing a gain adjustment in a transmission mode of a beam-forming circuit according to example embodiments.

FIG. 7 is a diagram for describing a gain adjustment in a transmission mode of a beam-forming circuit according to example embodiments.

Referring to FIGS. 1, 3 and 7, in the transmission mode, the multi mode power amplifier 5100 or 5100*a* performs the first transmission gain adjustment function based on the first control signal CONT1, and the variable gain phase shifter 5300 or 5300*a* performs the second transmission gain adjustment function and the transmission phase adjustment function at one time based on the third control signal CONT3. When considering the arrangement on the transmission path, the second transmission gain adjustment function may be performed first, and then the first transmission gain adjustment function may be performed later.

When the first transmission gain adjustment function is performed, a gain (e.g., power gain) of the first RF output signal RF_TX_OUT with respect to the first RF input signal RF_TX_IN may be controlled or adjusted by a first unit. When the second transmission gain adjustment function is performed, the gain of the first RF output signal RF_TX_OUT with respect to the first RF input signal RF_TX_IN may be controlled or adjusted by a second unit smaller than the first unit.

Specifically, as illustrated in FIG. 7, the gain may be controlled or adjusted in a gain region TX_PG1 when the multi mode power amplifier 5100 or 5100*a* operates in the first amplification mode (e.g., the first amplification mode MODE1 in FIG. 4A), and the gain may be controlled or adjusted in a gain region TX_PG2 that is different from the gain region TX_PG1 (e.g., that is lower than the gain region TX_PG1) when the multi mode power amplifier 5100 or 5100*a* operates in the second amplification mode (e.g., the second amplification mode MODE2 in FIG. 4A). For example, a solid line of the gain region TX_PG1 and a solid line of the gain region TX_PG2 in FIG. 7 may be substantially the same as a gain curve of the first amplification mode MODE1 and a gain curve of the second amplification mode MODE2 in FIG. 4A, respectively.

The variable gain phase shifter 5300 or 5300*a* may perform the phase and gain adjustment operations described with reference to FIGS. 5B and 5C, and thus the gain may be controlled or adjusted as illustrated by dotted lines in the gain region TX_PG1 or by dotted lines in the gain region TX_PG2.

In other words, in the transmission mode, a most significant bit (MSB) portion of the gain adjustment may be performed by the first transmission gain adjustment function using the multi mode power amplifier 5100 or 5100*a*, and a least significant bit (LSB) portion of the gain adjustment may be performed by the second transmission gain adjustment function using the variable gain phase shifter 5300 or 5300*a*. For example, one of the gain regions TX_PG1 and TX_PG2 may be determined by the first transmission gain adjustment function, and the gain may be controlled or adjusted in detail in one of the gain regions TX_PG1 and TX_PG2 by the second transmission gain adjustment function. The first transmission gain adjustment function using the multi mode power amplifier 5100 or 5100*a* may be a coarse gain adjustment function, and the second transmission gain adjustment function using the variable gain phase shifter 5300 or 5300*a* may be a fine gain adjustment function.

As described above, since the multi mode power amplifier 5100 or 5100*a* is responsible for the MSB portion of the gain adjustment and the variable gain phase shifter 5300 or 5300*a* is responsible for the LSB portion of the gain adjustment, the dynamic range of gain adjustment may be increased and the fine gain control may be efficiently implemented.

Figure 8:
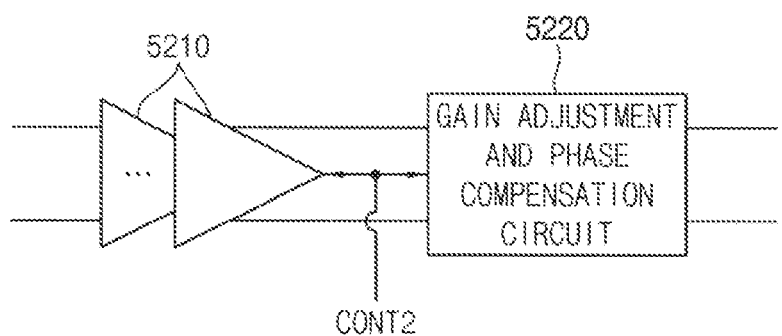
FIGS. 8 and 9 are diagrams for describing an operation of a variable gain low noise amplifier included in a beam-forming circuit according to example embodiments.
Figure 9:
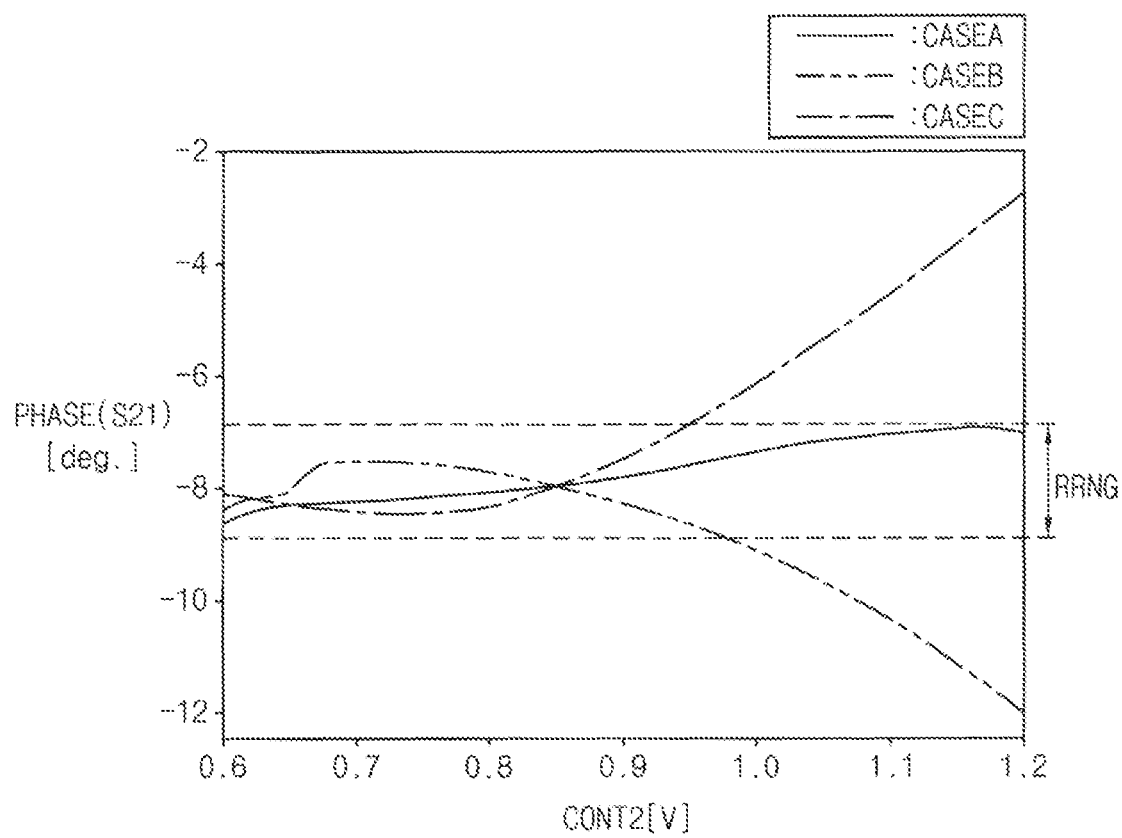

FIGS. 8 and 9 are diagrams for describing an operation of a variable gain low noise amplifier included in a beam-forming circuit according to example embodiments.

Referring to FIGS. 1, 3 and 8, the variable gain low noise amplifier 5200 or 5200*a* includes at least two amplification circuits 5210, and a gain adjustment and phase compensation circuit 5220.

Each of the amplification circuits 5210 may be implemented in a differential cascode type, and may include at least one transistor having a first type. The gain adjustment and phase compensation circuit 5220 may be connected to one of the amplification circuits 5210 that is disposed at a last stage (e.g., an amplification circuit of the last stage), may include a first transistor having a second type opposite to the first type, and may further include a first resistor connected in parallel with the first transistor.

The gain adjustment and phase compensation circuit 5220 may adjust or control a gain of an output signal based on the second control signal CONT2, and may further compensate a phase change of the output signal based on the second control signal CONT2. For example, the second control signal CONT2 may be commonly used as a gate bias voltage for the transistor having the first type included in the amplification circuit of the last stage and the first transistor having the second type included in the gain adjustment and phase compensation circuit 5220. By appropriately setting the size of the transistor having the first type, the size of the first transistor having the second type and a body bias voltage VPB applied to the first transistor, the gain adjustment function and the phase change compensation function may be simultaneously or concurrently performed at one time or at the same time.

Referring to FIGS. 8 and 9, when a level of the second control signal CONT2 increases, an impedance of the transistor having the first type (e.g., an n-type metal oxide semiconductor (NMOS) transistor) may be changed such that a difference between a phase of an input signal and a phase of an output signal increases (e.g., a value of S21 gradually decreases in a range smaller than 0), as illustrated by CASEB in FIG. 9. In addition, when the level of the second control signal CONT2 increases, an impedance of the first transistor having the second type (e.g., a p-type metal oxide semiconductor (PMOS) transistor) may be changed such that the difference between the phase of the input signal and the phase of the output signal decreases (e.g., the value of S21 gradually increases in the range smaller than 0), as illustrated by CASEC in FIG. 9. As a result, when considering the variable gain low noise amplifier 5200 or 5200*a* as a whole (e.g., when CASEB and CASEC are considered together), the difference between the phase of the input signal and the phase of the output signal may have a value within a reference range RRNG, as illustrated by CASEA in FIG. 9, and may be substantially maintained in a constant, based on the sum of the change in the impedance of the transistor having the first type and the change in the impedance of the first transistor having the second type. In other words, it may be checked that the gain adjustment function and the phase change compensation function are simultaneously performed.

Typically, a noise figure (NF) characteristic of the low noise amplifier may be mainly determined at a first amplification stage of the low noise amplifier. Thus, when the gain adjustment and phase compensation circuit 5220 is connected to an output of the last amplification stage of the low noise amplifier as illustrated in FIG. 8, the gain at the first amplification stage may be sufficiently ensured to prevent degradation or deterioration of the noise figure characteristic.

Figure 10:
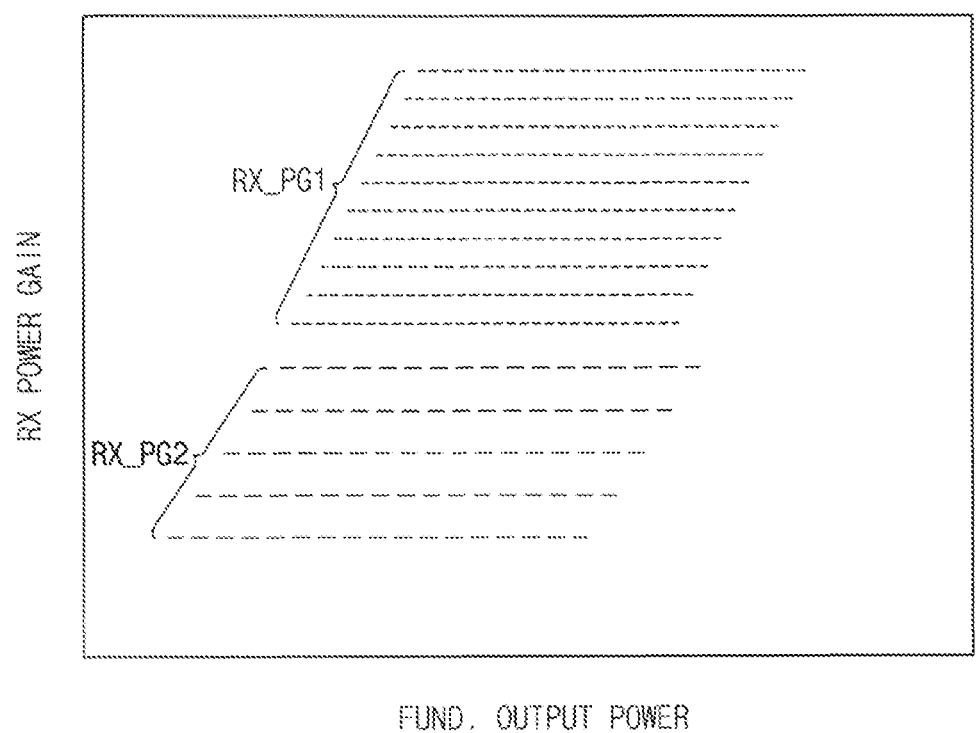
FIG. 10 is a diagram for describing a gain adjustment in a reception mode of a beam-forming circuit according to example embodiments.

FIG. 10 is a diagram for describing a gain adjustment in a reception mode of a beam-forming circuit according to example embodiments.

Referring to FIGS. 1, 3 and 10, in the reception mode, the variable gain low noise amplifier 5200 or 5200a performs the first reception gain adjustment function based on the second control signal CONT2, and the variable gain phase shifter 5300 or 5300a performs the second reception gain adjustment function and the reception phase adjustment function at one time based on the third control signal CONT3. When considering the arrangement on the reception path, the first reception gain adjustment function may be performed first, and then the second reception gain adjustment function may be performed later.

When the first reception gain adjustment function is performed, a gain (e.g., power gain) of the second RF output signal RF_RX_OUT with respect to the second RF input signal RF_RX_IN may be controlled or adjusted by a third unit in a first gain region. When the second reception gain adjustment function is performed, the gain of the second RF output signal RF_RX_OUT with respect to the second RF input signal RF_RX_IN may be controlled or adjusted by the second unit in a second gain region different from the first gain region. The third unit may be different from or may be substantially the same as the second unit.

Specifically, as illustrated in FIG. 10, the variable gain low noise amplifier 5200 or 5200a may perform the gain adjustment and phase change compensation operations described with reference to FIGS. 8 and 9, and thus the gain may be controlled or adjusted as illustrated by dotted lines in a gain region RX_PG2 of FIG. 10.

The variable gain phase shifter 5300 or 5300a may perform the phase and gain adjustment operations described with reference to FIGS. 5B and 5C, and thus the gain may be controlled or adjusted as illustrated by dotted lines in a gain region RX_PG1 of FIG. 10. Since the same variable gain phase shifter 5300 or 5300a is used in both the transmission mode and the reception mode, the arrangement of the dotted lines in the gain region RX_PG1 of FIG. 10 may be substantially the same as the arrangement of the dotted lines in the gain region TX_PG1 of FIG. 7.

In other words, in the reception mode, a first LSB portion of the gain adjustment may be performed by the first reception gain adjustment function using the variable gain low noise amplifier 5200 or 5200a, and a second LSB portion of the gain adjustment may be performed by the second reception gain adjustment function using the variable gain phase shifter 5300 or 5300a. Both the first reception gain adjustment function using the variable gain low noise amplifier 5200 or 5200a and the second reception gain adjustment function using the variable gain phase shifter 5300 or 5300a may be a fine gain adjustment function.

As described above, both the variable gain low noise amplifier 5200 or 5200a and the variable gain phase shifter 5300 or 5300a are responsible for the LSB portion of the gain adjustment. Particularly, since the noise figure characteristic is degraded when the gain of the variable gain low noise amplifier 5200 or 5200a is changed greatly, the variable gain low noise amplifier 5200 or 5200a may be responsible for the lower gain region. Thus, the dynamic range of gain adjustment may be increased while preventing the degradation or deterioration of the noise figure characteristic.

Figure 11:
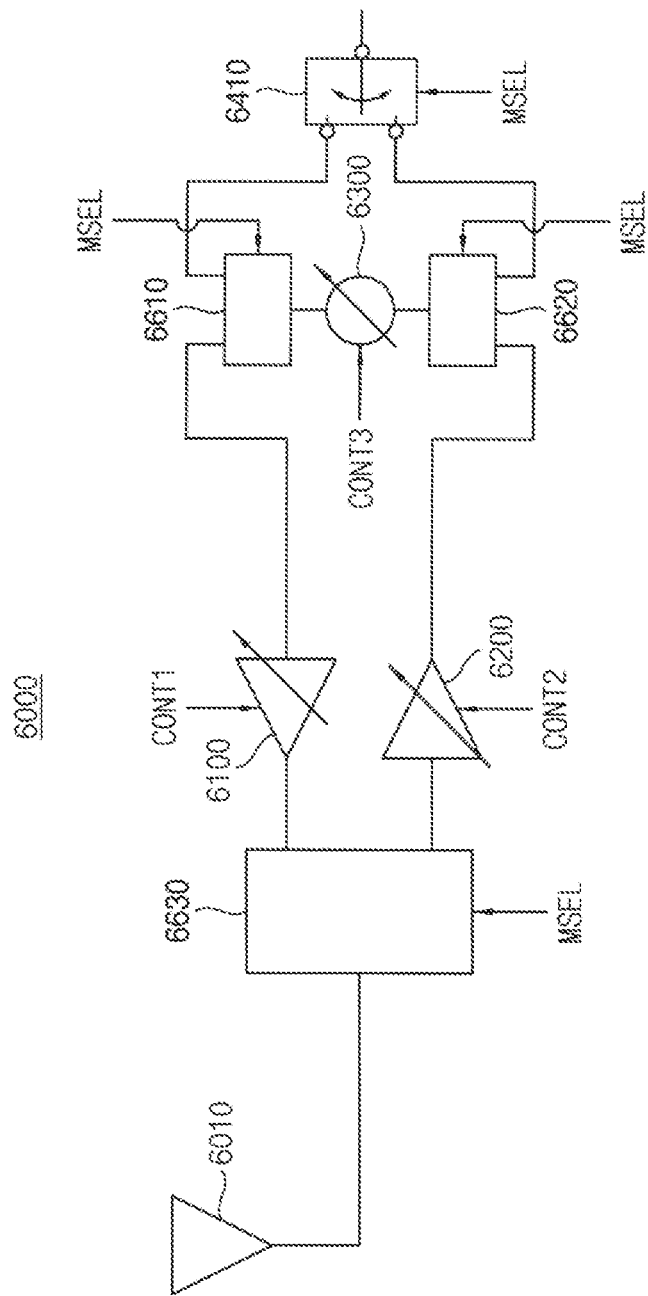
FIG. 11 is a block diagram illustrating a beam-forming circuit according to example embodiments.

FIG. 11 is a block diagram illustrating a beam-forming circuit according to example embodiments.

Referring to FIG. 11, a beam-forming circuit 6000 includes a multi mode power amplifier 6100, a variable gain low noise amplifier 6200, a variable gain phase shifter 6300 and a first switch circuit 6410. The beam-forming circuit 6000 may further include a first switch embedded impedance matching circuit 6610, a second switch embedded impedance matching circuit 6620 and a third switch embedded impedance matching circuit 6630.

The beam-forming circuit 6000 of FIG. 11 may be substantially the same as the beam-forming circuit 5000 of FIG. 1, except that the switch embedded impedance matching circuits 6610, 6620 and 6630 in FIG. 11 are implemented by integrating the switch circuits 5420, 5430 and 5440 in FIG. 1 into impedance matching circuits. The multi mode power amplifier 6100, the variable gain low noise amplifier 6200, the variable gain phase shifter 6300 and the first switch circuit 6410 in FIG. 11 may be substantially the same as the multi mode power amplifier 5100, the variable gain low noise amplifier 5200, the variable gain phase shifter 5300 and the first switch circuit 5410 in FIG. 1, respectively.

The first switch embedded impedance matching circuit 6610 may be disposed or located between the multi mode power amplifier 6100, the first switch circuit 6410 and the variable gain phase shifter 6300. The second switch embedded impedance matching circuit 6620 may be disposed or located between the variable gain low noise amplifier 6200, the first switch circuit 6410 and the variable gain phase shifter 6300. The third switch embedded impedance matching circuit 6630 may be disposed or located the multi mode power amplifier 6100, the variable gain low noise amplifier 6200 and an antenna 6010.

An electrical connection state of each of the first, second and third switch embedded impedance matching circuits 6610, 6620 and 6630 may be controlled based on the mode selection signal MSEL. An operation of each of the first, second and third switch embedded impedance matching circuits 6610, 6620 and 6630 may be substantially the same as an operation of a respective one of the second, third and fourth switch circuits 5420, 5430 and 5440 in FIG. 1.

The beam-forming circuit 6000 according to example embodiments may include the variable gain phase shifter 6300 that independently controls the phase and gain of the signal at one time. One variable gain phase shifter 6300 may be shared by the transmission path and the reception path, and thus the size, area and power consumption may be reduced. In addition, the number of individual and different blocks included in the beam-forming circuit 6000 may be reduced by implementing the switch circuits integrated in the impedance matching circuits, and thus the size and area may be further reduced.

In the beam-forming circuit 6000 according to example embodiments, by using the variable gain phase shifter 6300, the phase error due to the gain variation may be minimized. In addition, by using the multi mode power amplifier 6100, the dynamic range of the transmission gain adjustment may be increased, the efficiency may be increased at relatively low power and at the region having relatively low gain, and the linearity may be improved. Additionally, by using the variable gain low noise amplifier 6200, the dynamic range of the reception gain adjustment may be increased, and the phase error may be further reduced.

Figure 12:
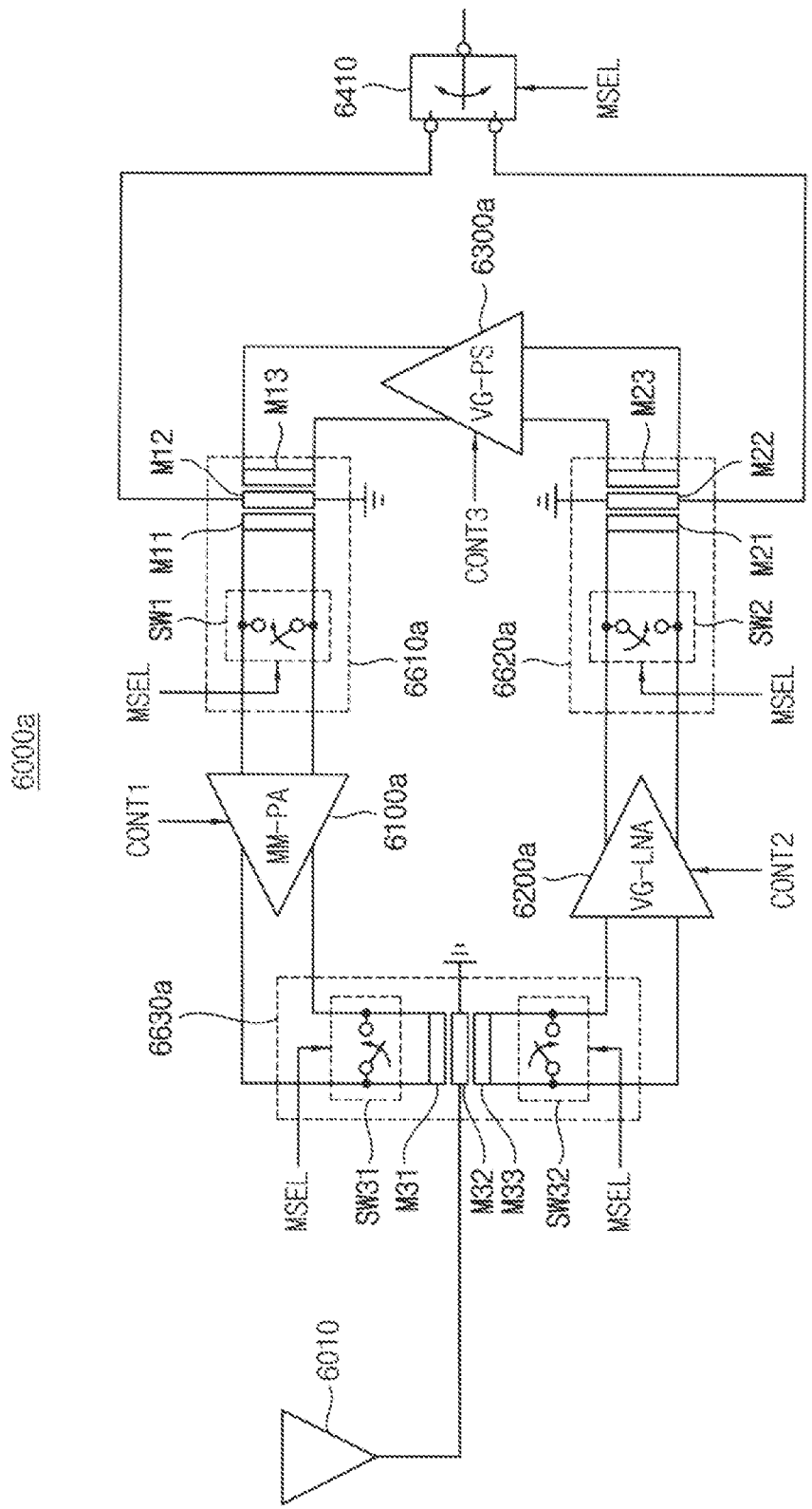
FIG. 12 is a block diagram illustrating a beam-forming circuit according to example embodiments.

FIG. 12 is a block diagram illustrating a beam-forming circuit according to example embodiments.

Referring to FIG. 12, a beam-forming circuit 6000a includes a multi mode power amplifier 6100a, a variable gain low noise amplifier 6200a, a variable gain phase shifter 6300a and a first switch circuit 6410. The beam-forming circuit 6000a may further include a first switch embedded impedance matching circuit 6610a, a second switch embedded impedance matching circuit 6620a and a third switch embedded impedance matching circuit 6630a.

The multi mode power amplifier 6100a, the variable gain low noise amplifier 6200a, the variable gain phase shifter 6300a and the first switch circuit 6410 in FIG. 12 may be substantially the same as the multi mode power amplifier 5100a, the variable gain low noise amplifier 5200a, the variable gain phase shifter 5300a and the first switch circuit 5410 in FIG. 3, respectively.

The first switch embedded impedance matching circuit 6610a may include a first transmission line M11, a second transmission line M12, a third transmission line M13 and a first switching element SW1. The first transmission line M11 may be connected to an input terminal (e.g., two input terminals) of the multi mode power amplifier 6100a. The second transmission line M12 may be connected to a second terminal of the first switch circuit 6410 and a ground terminal. The third transmission line M13 may be connected to an output terminal (e.g., two output terminals) of the variable gain phase shifter 6300a. The first switching element SW1 may be connected in parallel with the first transmission line M11 to the input terminal of the multi mode power amplifier 6100a, and may be turned on or off based on the mode selection signal MSEL. The first and second transmission lines M11 and M12 may operate as an input impedance matching circuit of the multi mode power amplifier 6100a, and the second and third transmission lines M12 and M13 may operate as an output impedance matching circuit of the variable gain phase shifter 6300a. In other words, one transmission line M12 may be shared by the input impedance matching circuit of the multi mode power amplifier 6100a and the output impedance matching circuit of the variable gain phase shifter 6300a. For example, each transmission line may include an arbitrary conductive material such as metal.

The second switch embedded impedance matching circuit 6620a may include a fourth transmission line M21, a fifth transmission line M22, a sixth transmission line M23 and a second switching element SW2. The fourth transmission line M21 may be connected to an output terminal (e.g., two output terminals) of the variable gain low noise amplifier 6200a. The fifth transmission line M22 may be connected to a third terminal of the first switch circuit 6410 and the ground terminal. The sixth transmission line M23 may be connected to an input terminal (e.g., two input terminals) of the variable gain phase shifter 6300a. The second switching element SW2 may be connected in parallel with the fourth transmission line M21 to the output terminal of the variable gain low noise amplifier 6200a, and may be turned on or off based on the mode selection signal MSEL. The fourth and fifth transmission lines M21 and M22 may operate as an output impedance matching circuit of the variable gain low noise amplifier 6200a, and the fifth and sixth transmission lines M22 and M23 may operate as an input impedance matching circuit of the variable gain phase shifter 6300a. In other words, one transmission line M22 may be shared by the output impedance matching circuit of the variable gain low noise amplifier 6200a and the input impedance matching circuit of the variable gain phase shifter 6300a.

The third switch embedded impedance matching circuit 6630a may include a seventh transmission line M31, an eighth transmission line M32, a ninth transmission line M33, a third switching element SW31 and a fourth switching element SW32. The seventh transmission line M31 may be connected to an output terminal (e.g., two output terminals) of the multi mode power amplifier 6100a. The eighth transmission line M32 may be connected to the antenna 6010 and the ground terminal. The ninth transmission line M33 may be connected to an input terminal (e.g., two input terminals) of the variable gain low noise amplifier 6200a. The third switching element SW31 may be connected in parallel with the seventh transmission line M31 to the output terminal of the multi mode power amplifier 6100a, and may be turned on or off based on the mode selection signal MSEL. The fourth switching element SW32 may be connected in parallel with the ninth transmission line M33 to the input terminal of the variable gain low noise amplifier 6200a, and may be turned on or off based on the mode selection signal MSEL. The seventh and eighth transmission lines M31 and M32 may operate as an output impedance matching circuit of the multi mode power amplifier 6100a, and the eighth and ninth transmission lines M32 and M33 may operate as an input impedance matching circuit of the variable gain low noise amplifier 6200a. In other words, one transmission line M32 may be shared by the output impedance matching circuit of the multi mode power amplifier 6100a and the input impedance matching circuit of the variable gain low noise amplifier 6200a.

Figure 13A:
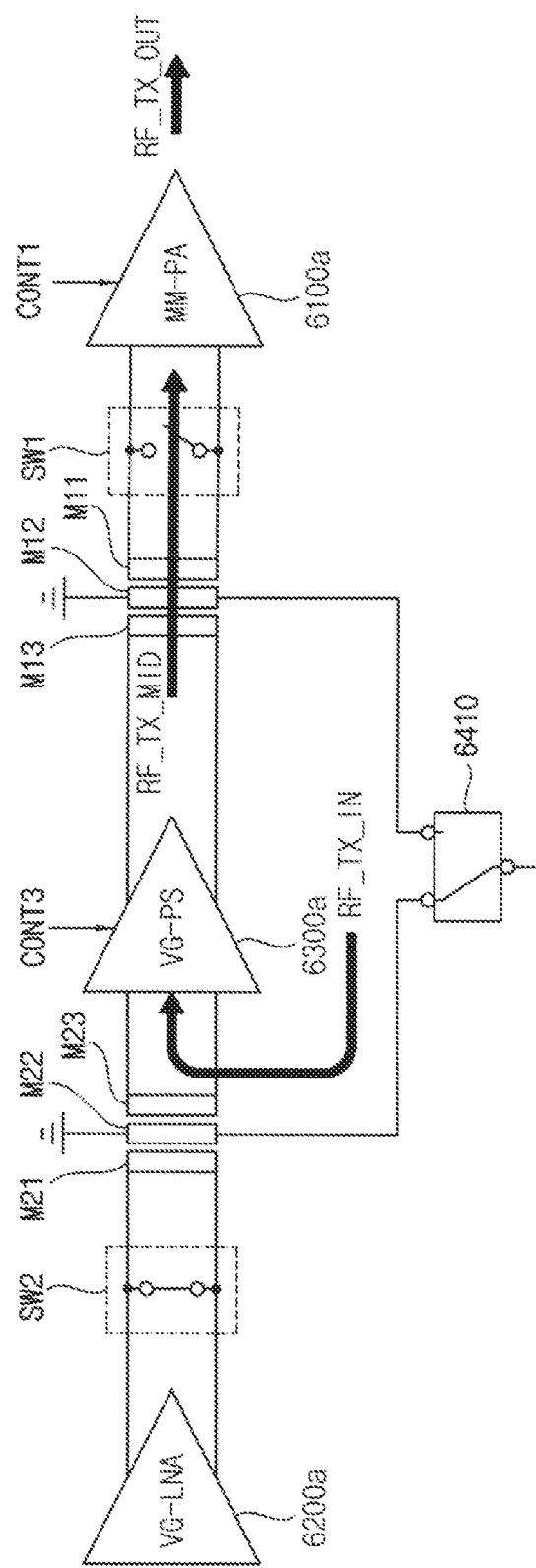
FIGS. 13A, 13B, 14A, 14B, 15A and 15B are diagrams for describing an operation of the beam-forming circuit of FIG. 12 in a transmission mode and a reception mode.
Figure 13B:
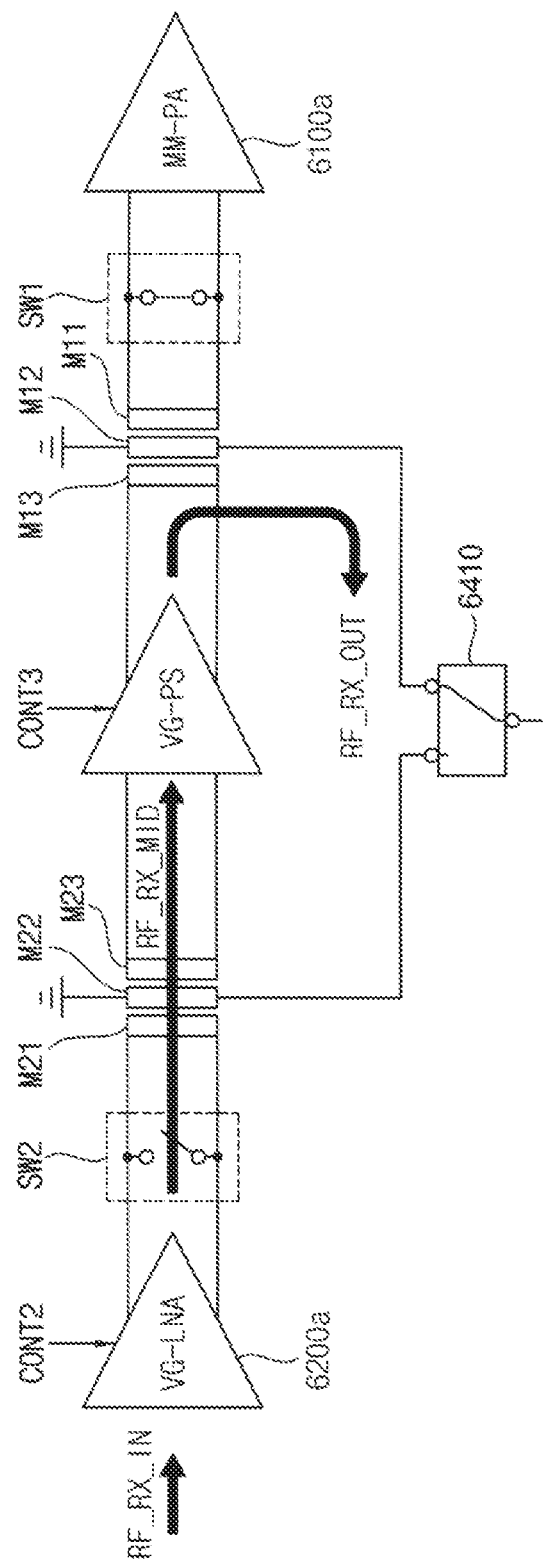
Figure 14A:
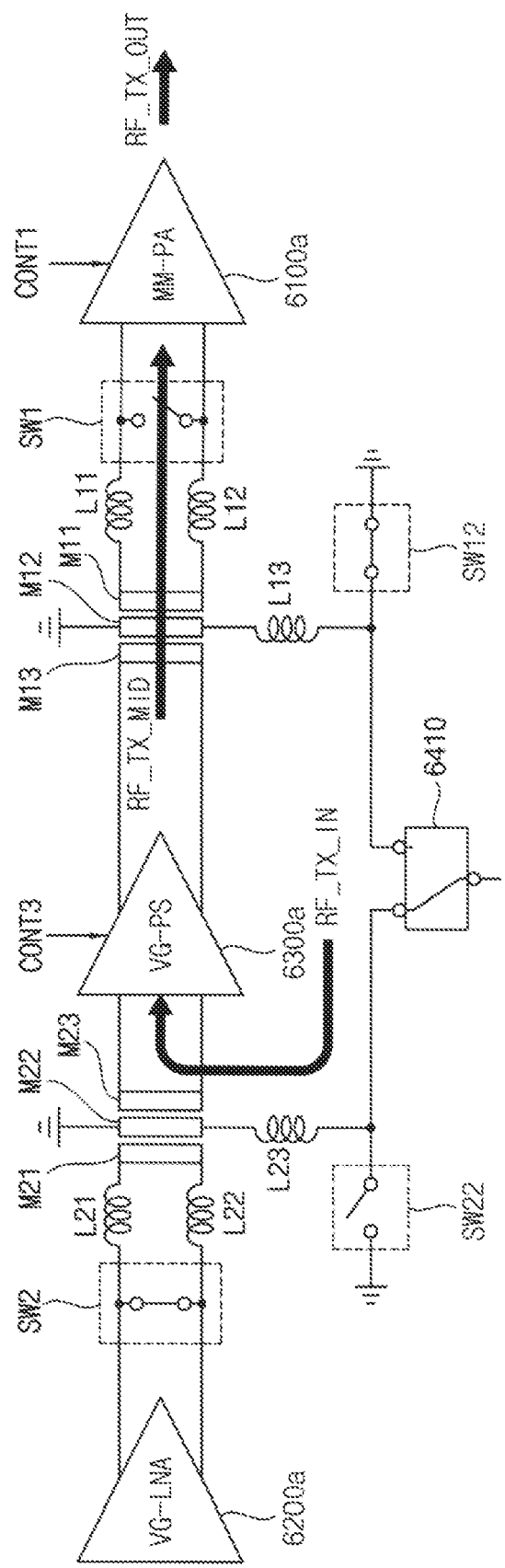
Figure 14B:
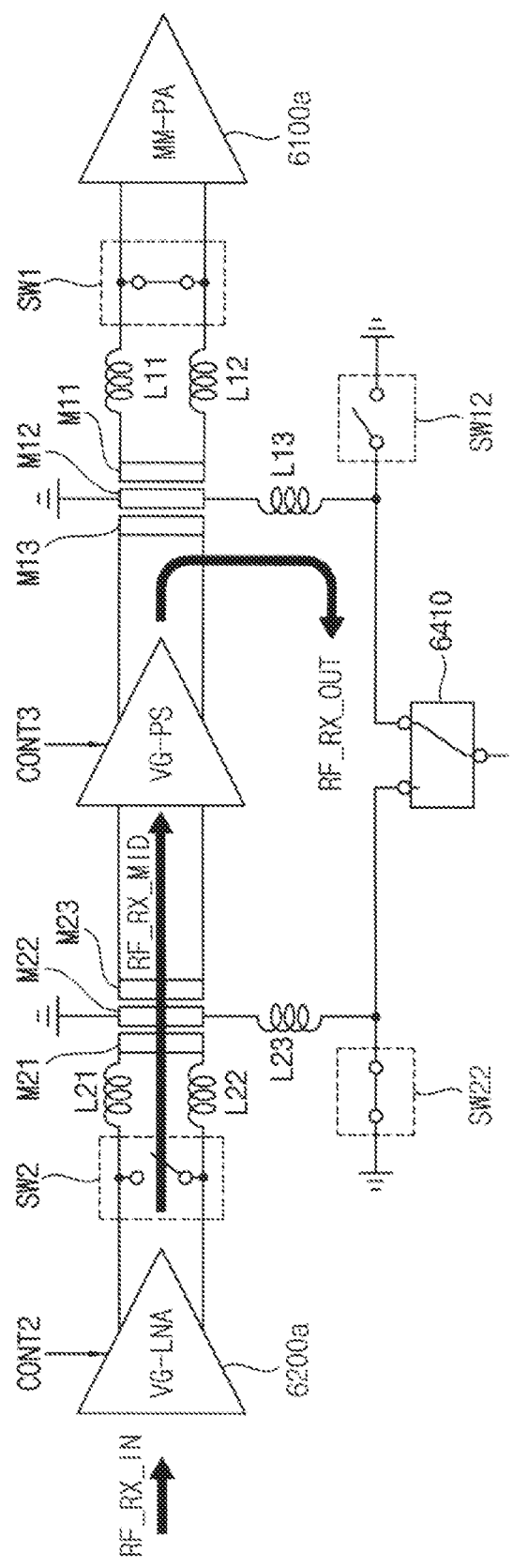
Figure 15A:
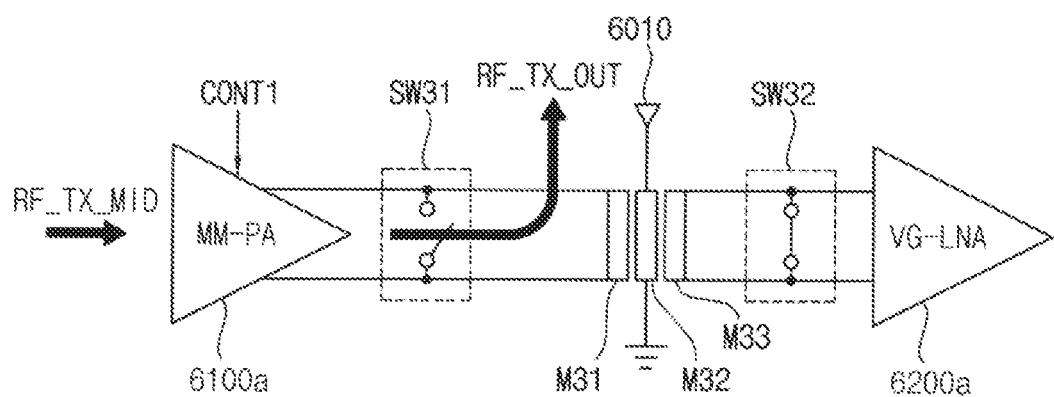
Figure 15B:
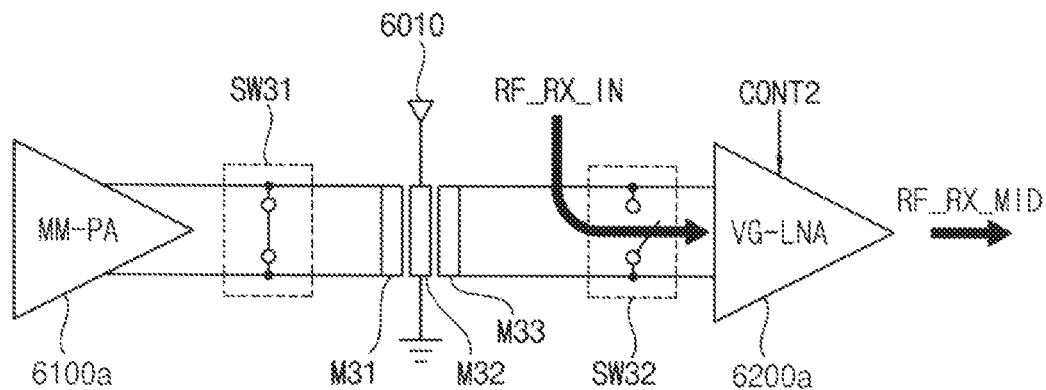

FIGS. 13A, 13B, 14A, 14B, 15A and 15B are diagrams for describing an operation of the beam-forming circuit of FIG. 12 in a transmission mode and a reception mode. FIGS. 13A, 13B, 14A and 14B illustrate operations associated with the first and second switch embedded impedance matching circuits 6610a and 6620a, and FIGS. 15A and 15B illustrate operations associated with the third switch embedded impedance matching circuit 6630a.

Referring to FIG. 13A, in the transmission mode, the first switching element SW1 may be electrically opened (e.g., turned off), and the second switching element SW2 may be electrically shorted (e.g., turned on). In this case, the first RF input signal RF_TX_IN received from the first switch circuit 6410 may be provided to the variable gain phase shifter 6300a via the fifth and sixth transmission lines M22 and M23. The variable gain phase shifter 6300a may generate the first RF intermediate signal RF_TX_MID based on the third control signal CONT3 and the first RF input signal RF_TX_IN, and the first RF intermediate signal RF_TX_MID output from the variable gain phase shifter 6300a may be provided to the multi mode power amplifier 6100a via the first, second and third transmission lines M11, M12 and M13. The multi mode power amplifier 6100a may generate the first RF output signal RF_TX_OUT based on the first control signal CONT1 and the first RF intermediate signal RF_TX_MID. At this time, the signal leakage to the variable gain low noise amplifier 6200a may be prevented by the second switching element SW2 which is shorted.

Referring to FIG. 13B, in the reception mode, the first switching element SW1 may be electrically shorted, and the second switching element SW2 may be electrically opened. In this case, the variable gain low noise amplifier 6200a may generate the second RF intermediate signal RF_RX_MID based on the second control signal CONT2 and the second RF input signal RF_RX_IN, and the second RF intermediate signal RF_RX_MID output from the variable gain phase low noise amplifier 6200a may be provided to the variable gain phase shifter 6300a via the fourth, fifth and sixth transmission lines M21, M22, and M23. The variable gain phase shifter 6300a may generate the second RF output signal RF_RX_OUT based on the third control signal CONT3 and the second RF intermediate signal RF_RX_MID, and the second RF output signal RF_RX_OUT output from the variable gain phase shifter 6300a may be provided to the first switch circuit 6410 via the second and third transmission lines M12 and M13. The first switch circuit 6410 may output the second RF output signal RF_RX_OUT. At this time, the signal leakage to the multi mode power amplifier 6100a may be prevented by the first switching element SW1 which is shorted.

Referring to FIG. 14A, an operation illustrated in FIG. 14A may be substantially the same as an operation illustrated in FIG. 13A, except that inductors L11, L12, L13, L21, L22 and L23 and switching elements SW12 and SW22 are further included in an example of FIG. 14A. It may be seen that the variable gain low noise amplifier 6200a is opened or disconnected by the second switching element SW2 which is shorted and the inductors L21 and L22 included in the second switch embedded impedance matching circuit 6620a. In addition, when the switching element SW12 included in the first switch embedded impedance matching circuit 6610a is turned on to make the ground visible and an actual impedance value seen at the second transmission line M12 through the inductor L13 appears to be infinite in the transmission mode, the isolation characteristic may be improved by about 20 dB or more, and thus the variable gain phase shifter with a relatively wide dynamic range (e.g., greater than about 18 dB) may be implemented.

Referring to FIG. 14B, an operation illustrated in FIG. 14B may be substantially the same as an operation illustrated in FIG. 13B, except that the inductors L11, L12, L13, L21, L22 and L23 and the switching elements SW12 and SW22 are further included in an example of FIG. 14B. It may be seen that the multi mode power amplifier 6100a is opened or disconnected by the first switching element SW1 which is shorted and the inductors L11 and L12 included in the first switch embedded impedance matching circuit 6610a. In addition, when the switching element SW22 included in the second switch embedded impedance matching circuit 6620a is turned on to make the ground visible and an actual impedance value seen at the fifth transmission line M22 through the inductor L23 appears to be infinite in the reception mode, the isolation characteristic may be improved, and thus the variable gain phase shifter with a relatively wide dynamic range may be implemented.

According to example embodiments, the switch embedded impedance matching circuits 6610a and 6620a may be implemented by including only the inductors L11, L12, L21 and L22 in FIGS. 14A and 14B and by omitting the inductors L13 and L23 and the switching elements SW12 and SW22 in FIGS. 14A and 14B, or the switch embedded impedance matching circuits 6610a and 6620a may be implemented by including only the inductors L13 and L23 and the switching elements SW12 and SW22 in FIGS. 14A and 14B and by omitting the inductors L11, L12, L21 and L22 in FIGS. 14A and 14B.

Referring to FIG. 15A, in the transmission mode, the third switching element SW31 may be electrically opened, and the fourth switching element SW32 may be electrically shorted. In this case, the multi mode power amplifier 6100a may generate the first RF output signal RF_TX_OUT based on the first control signal CONT1 and the first RF intermediate signal RF_TX_MID. The first RF output signal RF_TX_OUT output from the multi mode power amplifier 6100a may be provided to the antenna 6010 via the seventh and eighth transmission lines M31 and M32, and may be output via the antenna 6010. At this time, the signal leakage to the variable gain low noise amplifier 6200a may be prevented by the fourth switching element SW32 which is shorted.

Referring to FIG. 15B, in the reception mode, the third switching element SW31 may be electrically shorted, and the fourth switching element SW32 may be electrically opened. In this case, the second RF input signal RF_RX_IN received from the antenna 6010 may be provided to the variable gain low noise amplifier 6200a via the eighth and ninth transmission lines M32 and M33, and the variable gain low noise amplifier 6200a may generate the second RF intermediate signal RF_RX_MID based on the second control signal CONT2 and the second RF input signal RF_RX_IN.

Although not illustrated in FIGS. 15A and 15B, the third switch embedded impedance matching circuit 6630a may further include inductors according to example embodiments, as described with reference to FIGS. 14A and 14B.

Figure 16:
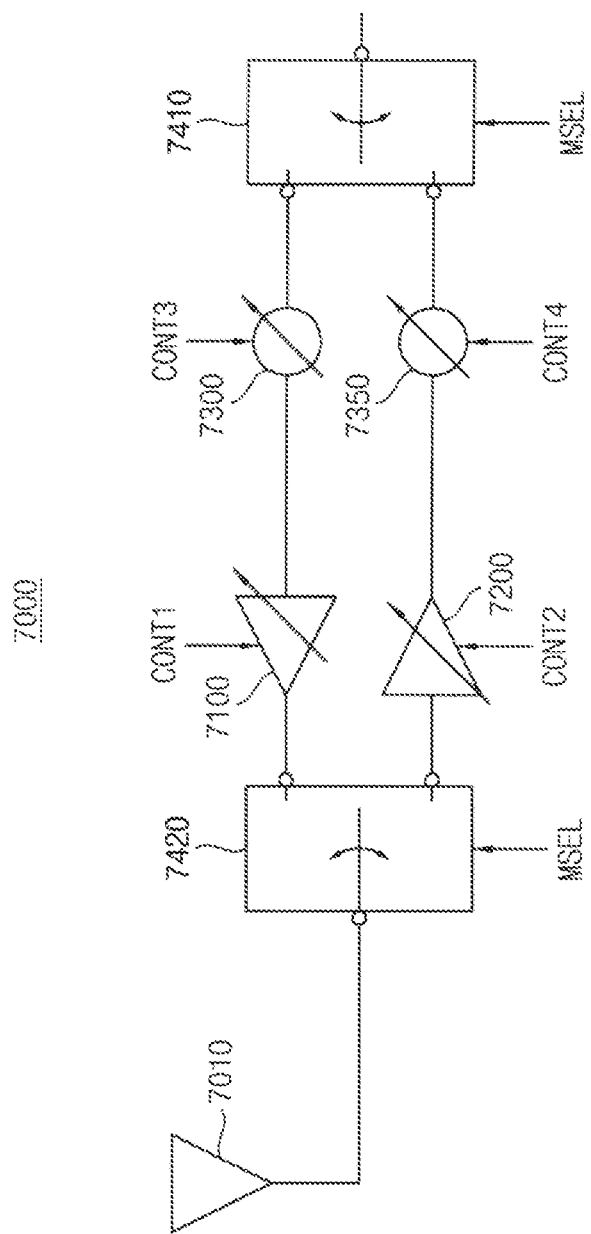
FIG. 16 is a block diagram illustrating a beam-forming circuit according to example embodiments.
Figure 17A:
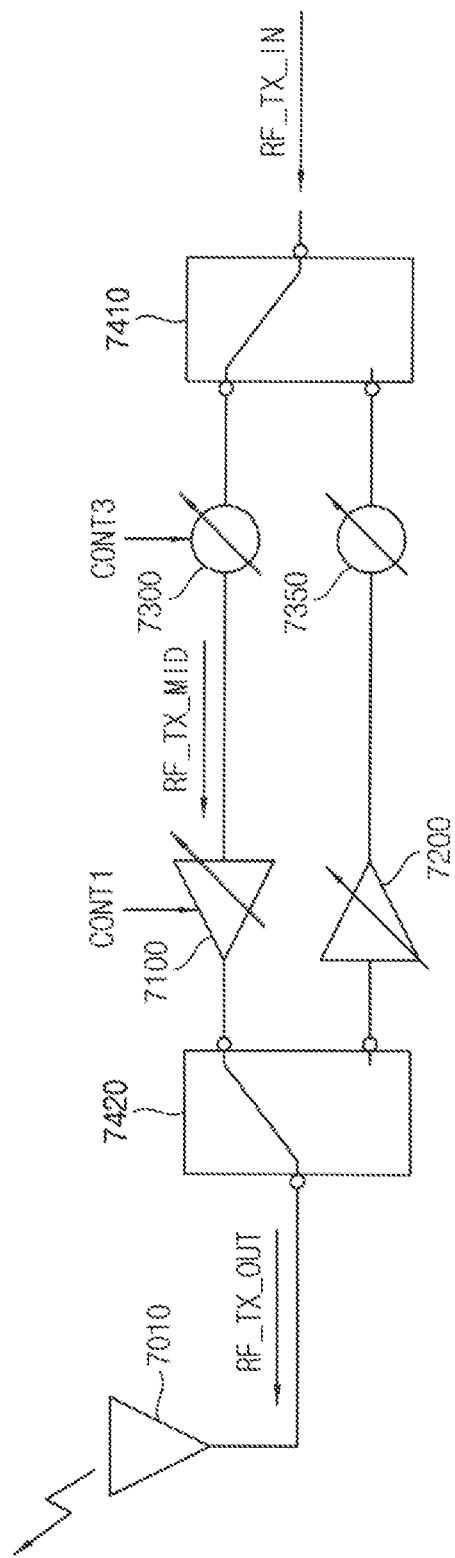
FIGS. 17A and 17B are diagrams for describing an operation of the beam-forming circuit of FIG. 16 in a transmission mode and a reception mode.
Figure 17B:
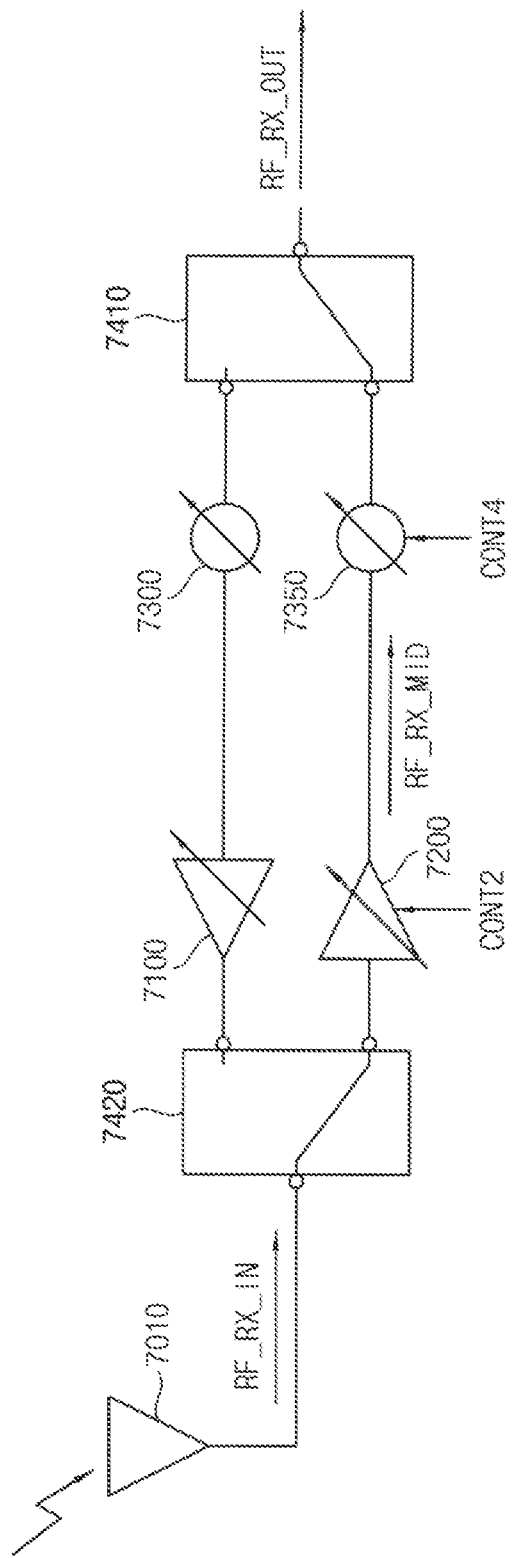

FIG. 16 is a block diagram illustrating a beam-forming circuit according to example embodiments. FIGS. 17A and 17B are diagrams for describing an operation of the beam-forming circuit of FIG. 16 in a transmission mode and a reception mode.

Referring to FIG. 16, a beam-forming circuit 7000 includes a multi mode power amplifier 7100, a variable gain low noise amplifier 7200, a first variable gain phase shifter 7300, a second variable gain phase shifter 7350, a first switch circuit 7410 and a second switch circuit 7420.

The beam-forming circuit 7000 of FIG. 16 may be substantially the same as the beam-forming circuit 5000 of FIG. 1, except that the variable gain phase shifter 7300 in FIG. 1 is separated into two variable gain phase shifters 7300 and 7350 and the second and third switch circuits 5420 and 5430 in FIG. 1 are omitted. The multi mode power amplifier 7100, the variable gain low noise amplifier 7200 and the second switch circuit 7420 in FIG. 16 may be substantially the same as the multi mode power amplifier 5100, the variable gain low noise amplifier 5200 and the fourth switch circuit 5440 in FIG. 1, respectively.

The first variable gain phase shifter 7300 independently performs the second transmission gain adjustment function and the transmission phase adjustment function for the transmission signal at one time based on the third control signal CONT3 in the transmission mode. The second variable gain phase shifter 7350 independently performs the second reception gain adjustment function and the reception phase adjustment function for the reception signal at one time based on a fourth control signal CONT4 in the reception mode. According to example embodiments, the first and second variable gain phase shifters 7300 and 7350 may be of the same type or of different types.

The first switch circuit 7410 may be electrically connected to one of the first and second variable gain phase shifters 7300 and 7350 based on the mode selection signal MSEL.

Referring to FIG. 17A, in the transmission mode, the first and second terminals of the first switch circuit 7410 may be electrically connected to each other, and the first and second terminals of the second switch circuit 7420 may be electrically connected to each other, based on the mode selection signal MSEL. Thus, a first path in which the first switch circuit 7410, the first variable gain phase shifter 7300, the multi mode power amplifier 7100, the second switch circuit 7420 and an antenna 7010 are sequentially connected may be enabled. The first path may be referred to as a transmission path.

The first switch circuit 7410 receives the first RF input signal RF_TX_IN from the outside (e.g., from the external signal processor) to provide the first RF input signal RF_TX_IN to the first variable gain phase shifter 7300. The first variable gain phase shifter 7300 controls the gain and the phase of the first RF input signal RF_TX_IN at one time based on the third control signal CONT3 to generate the first RF intermediate signal RF_TX_MID. The multi mode power amplifier 7100 amplifies the first RF intermediate signal RF_TX_MID based on the first control signal CONT1 to generate the first RF output signal RF_TX_OUT. The first RF output signal RF_TX_OUT is provided to the antenna 7010 via the second switch circuit 7420, and is transmitted to the outside (e.g., to the external communication terminal) via the antenna 7010.

In the transmission mode, the multi mode power amplifier 7100 performs the first transmission gain adjustment function based on the first control signal CONT1, and the first variable gain phase shifter 7300 performs the second transmission gain adjustment function and the transmission phase adjustment function at one time based on the third control signal CONT3. In other words, the gain adjustment function may be distributed or spread in the transmission mode using the multi mode power amplifier 7100 and the first variable gain phase shifter 7300.

Referring to FIG. 17B, in the reception mode, the first and third terminals of the first switch circuit 7410 may be electrically connected to each other, and the first and third terminals of the second switch circuit 7420 may be electrically connected to each other, based on the mode selection signal MSEL. Thus, a second path in which the antenna 7010, the second switch circuit 7420, the variable gain low noise amplifier 7200, the second variable gain phase shifter 7350 and the first switch circuit 7410 are sequentially connected may be enabled. The second path may be referred to as a reception path.

The antenna 7010 receives the second RF input signal RF_RX_IN from the outside (e.g., from the external communication terminal). The second RF input signal RF_RX_IN is provided to the variable gain low noise amplifier 7200 via the second switch circuit 7420. The variable gain low noise amplifier 7200 amplifies the second RF input signal RF_RX_IN based on the second control signal CONT2 to generate the second RF intermediate signal RF_RX_MID. The second variable gain phase shifter 7350 controls the gain and the phase of the second RF intermediate signal RF_RX_MID at one time based on a fourth control signal CONT4 to generate the second RF output signal RF_RX_OUT. The second RF output signal RF_RX_OUT is output via the first switch circuit 7410, and is provided to the outside (e.g., to the external signal processor).

In the reception mode, the variable gain low noise amplifier 7200 performs the first reception gain adjustment function based on the second control signal CONT2, and the second variable gain phase shifter 7350 performs the second reception gain adjustment function and the reception phase adjustment function at one time based on the fourth control signal CONT4. In other words, the gain adjustment function may be distributed or spread in the reception mode using the variable gain low noise amplifier 7200 and the second variable gain phase shifter 7350. In addition, the variable gain low noise amplifier 7200 may further perform the phase change compensation function based on the second control signal CONT2.

The beam-forming circuit 7000 according to example embodiments may include the variable gain phase shifters 7300 and 7350 each of which independently controls the phase and gain of the signal at one time, and thus the size, area and power consumption may be reduced. By using the variable gain phase shifters 7300 and 7350, the phase error due to the gain variation may be minimized. In addition, by using the multi mode power amplifier 7100, the dynamic range of the transmission gain adjustment may be increased, the efficiency may be increased at relatively low power and at the region having relatively low gain, and the linearity may be improved. Additionally, by using the variable gain low noise amplifier 7200, the dynamic range of the reception gain adjustment may be increased, and the phase error may be further reduced.

Although not illustrated in FIG. 16, the first and second switching circuits 7410 and 7420 may be integrated into the impedance matching circuits to implement the switch embedded impedance matching circuits according to example embodiments, as described with reference to FIG. 12.

In some example embodiments, the first and second variable gain phase shifters 7300 and 7350 may be of the same type. In this case, as described with reference to FIG. 7, the MSB portion of the gain adjustment in the transmission mode may be performed by the first transmission gain adjustment function using the multi mode power amplifier 7100, and the LSB portion of the gain adjustment in the transmission mode may be performed by the second transmission gain adjustment function using the first variable gain phase shifter 7300. In addition, as described with reference to FIG. 10, the first LSB portion of the gain adjustment in the reception mode may be performed by the first reception gain adjustment function using the variable gain low noise amplifier 7200, and the second LSB portion of the gain adjustment in the reception mode may be performed by the second reception gain adjustment function using the second variable gain phase shifter 7350.

In other example embodiments, the first and second variable gain phase shifters 7300 and 7350 may be of different types. In this case, as described with reference to FIG. 7, the MSB portion of the gain adjustment in the transmission mode may be performed by the first transmission gain adjustment function using the multi mode power amplifier 7100, and the LSB portion of the gain adjustment in the transmission mode may be performed by the second transmission gain adjustment function using the first variable gain phase shifter 7300. In addition, as with an example of FIG. 7 (although not illustrated), a MSB portion of the gain adjustment in the reception mode may be performed by the second reception gain adjustment function using the second variable gain phase shifter 7350, and a LSB portion of the gain adjustment in the reception mode may be performed by the first reception gain adjustment function using the variable gain low noise amplifier 7200. Since the variable gain low noise amplifier 7200 is responsible for the LSB portion of the gain adjustment, the degradation or deterioration of the noise figure characteristic may be prevented.

Figure 18A:
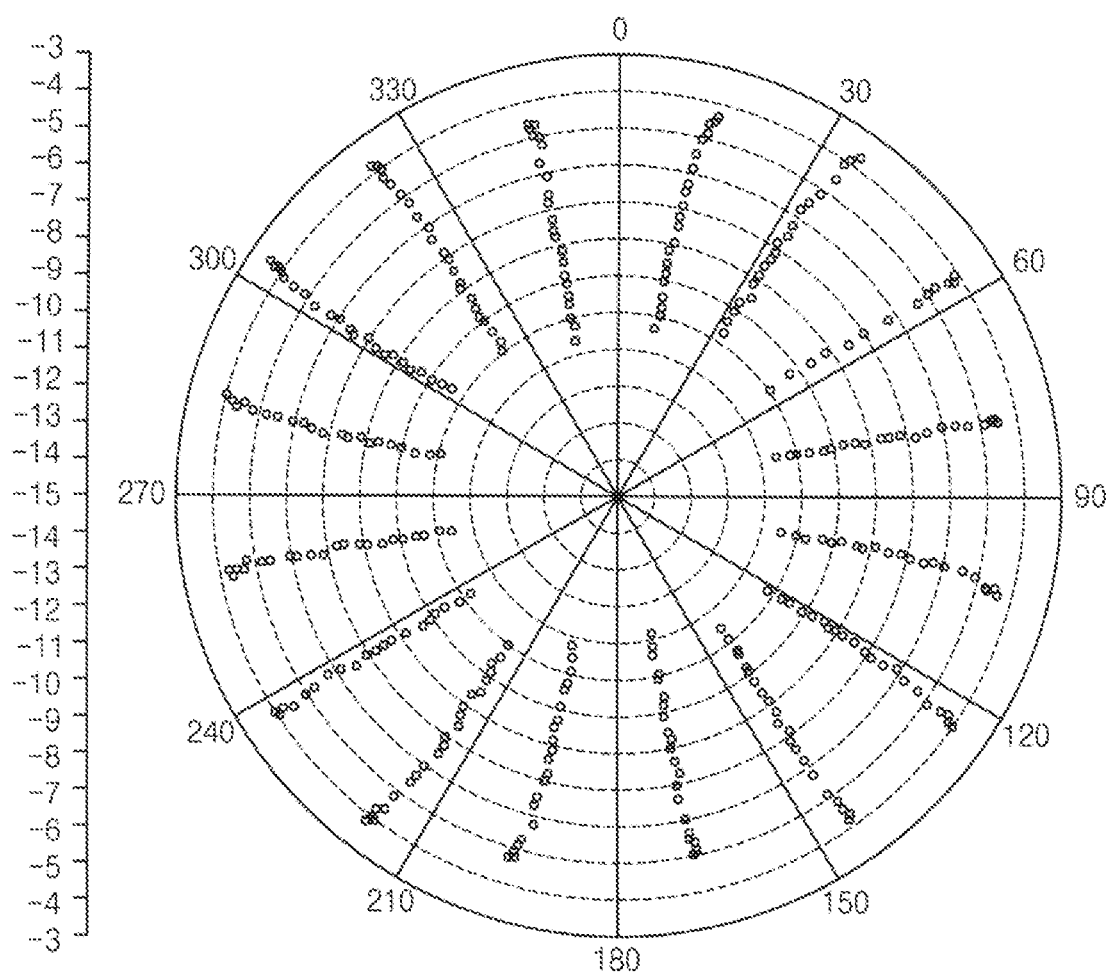
FIGS. 18A and 18B are diagrams for describing a gain adjustment in a transmission mode and a reception mode of a beam-forming circuit according to example embodiments.
Figure 18B:
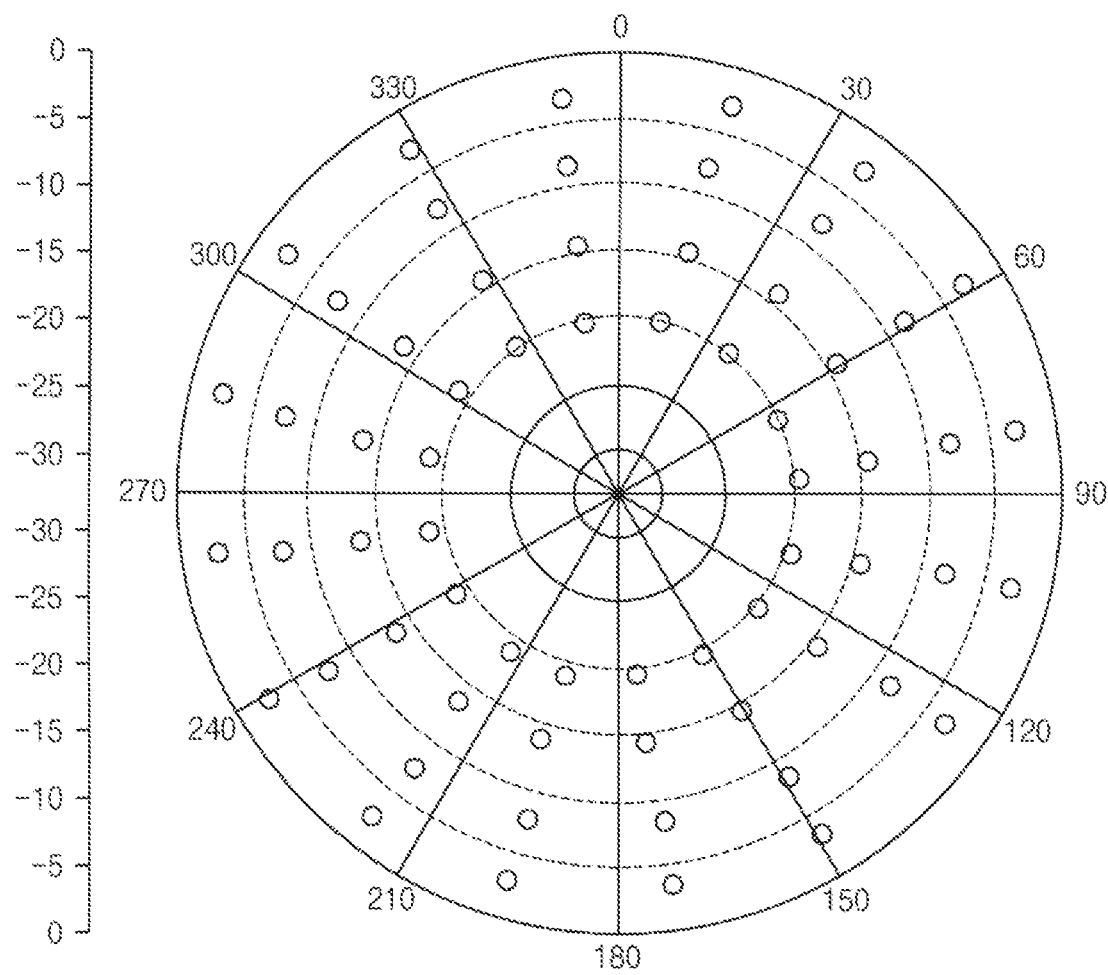

FIGS. 18A and 18B are diagrams for describing a gain adjustment in a transmission mode and a reception mode of a beam-forming circuit according to example embodiments.

Referring to FIG. 18A, the first variable gain phase shifter 7300 may always be responsible for the LSB portion of the transmission gain adjustment, and thus the fine gain control may be implemented. When the second variable gain phase shifter 7350 is of the same type as the first variable gain phase shifter 7300, the fine gain control may also be implemented by the second variable gain phase shifter 7350.

Referring to FIG. 18B, when the second variable gain phase shifter 7350 is of a different type than the first variable gain phase shifter 7300, the second variable gain phase shifter 7350 may be responsible for the MSB portion of the transmission gain adjustment, and thus the dynamic range of gain adjustment may be increased.

Figure 19:
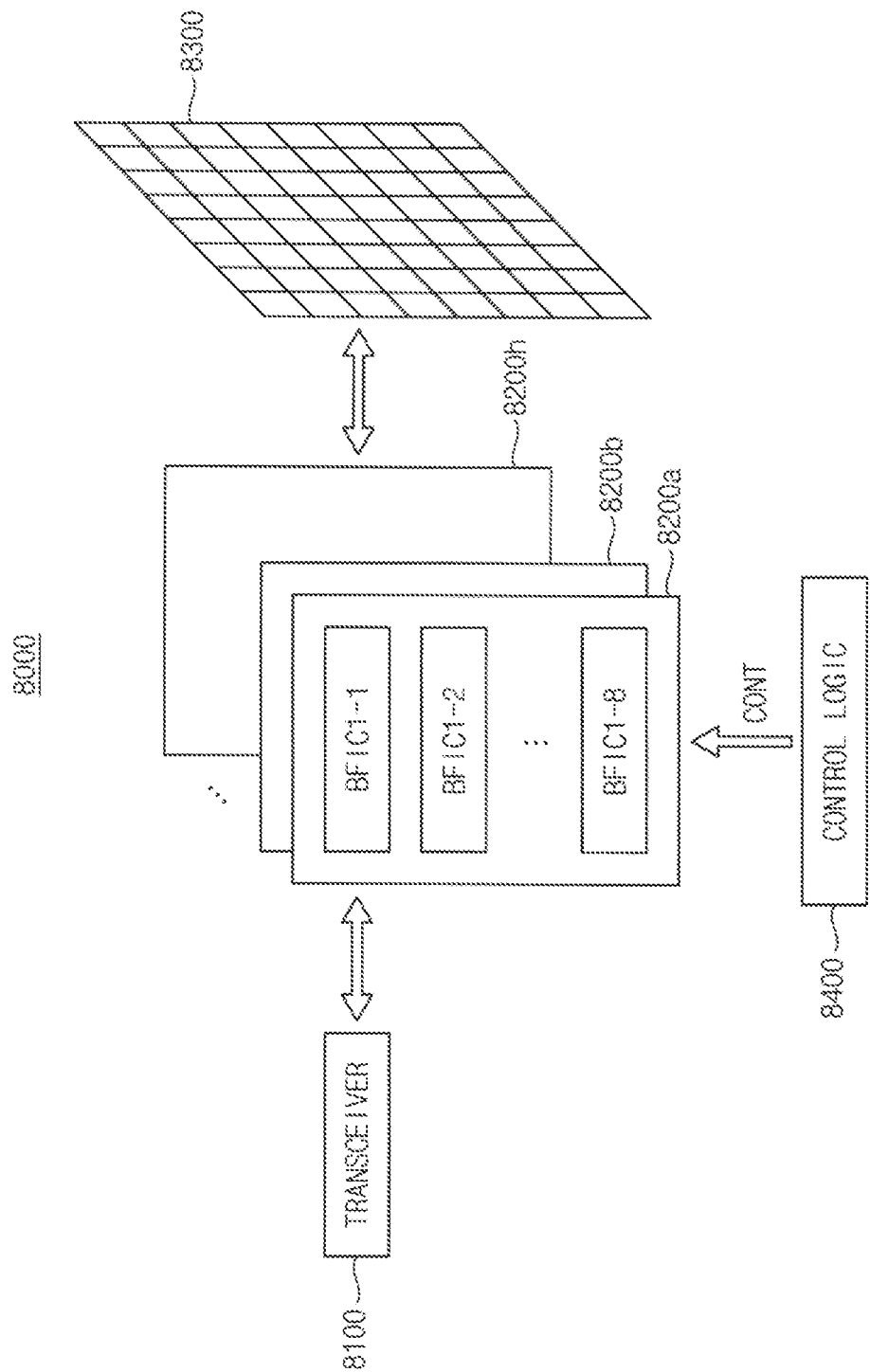
FIG. 19 is a block diagram illustrating a beam-forming system including a beam-forming circuit according to example embodiments.

FIG. 19 is a block diagram illustrating a beam-forming system including a beam-forming circuit according to example embodiments.

Referring to FIG. 19, a beam-forming system 8000 includes a transceiver 8100, a plurality of beam-forming circuit arrays 8200a, 8200b, . . . , 8200h, an antenna array 8300 and a control logic 8400. Although FIG. 19 illustrates an 8*8 channel active phase array system, the number of elements or blocks included in the beam-forming system may be changed according to example embodiments.

In the transmission mode, the transceiver 8100 performs operations such as encoding/decoding, encryption/decryption and/or modulation/demodulation on data to be transmitted to sequentially convert the data into baseband signals, intermediate frequency signals and RF signals, and provides the converted signals to the plurality of beam-forming circuit arrays 8200a-8200h. In the reception mode, the transceiver 8100 performs operations such as encoding/decoding, encryption/decryption and/or modulation/demodulation on RF signals received from the antenna array 8300 and the plurality of beam-forming circuit arrays 8200a-8200h to sequentially convert the RF signals into intermediate frequency signals, baseband signals and data.

The plurality of beam-forming circuit arrays 8200a-8200h include a plurality of beam-forming circuits. For example, the beam-forming circuit array 8200a includes first through eighth beam-forming circuits BFIC1-1, BFIC1-2, . . . , BFIC1-8. Although not illustrated in FIG. 19, each of the beam-forming circuit arrays 8200b-8200h may also each include a plurality of beam-forming circuits.

Each of the plurality of beam-forming circuits (e.g., the beam-forming circuits BFIC1-1, BFIC1-2, . . . , BFIC1-8) included in the plurality of beam-forming circuit arrays 8200a-8200h may be the beam-forming circuit according to example embodiments. For example, each beam-forming circuit may include the multi mode power amplifier, the variable gain low noise amplifier and at least one variable gain phase shifter, and may have ultra small characteristics with reduced size and area, low power characteristics with reduced power consumption and high performance characteristics with low insertion loss (e.g., low loss characteristics) and low phase error (e.g., high linearity characteristics) in gain adjustment. Accordingly, the beam-forming system 8000 may have improved or enhanced performance.

The antenna array 8300 includes a plurality of antennas. Each antenna may be connected to a corresponding beam-forming circuit to transmit/receive a signal.

The control logic 8400 generates control signals CONT for controlling the plurality of beam-forming circuits (e.g., the beam-forming circuits BFIC1-1, BFIC1-2, . . . , BFIC1-8). For example, the control signals CONT may include a plurality of first control signals (e.g., the first control signal CONT1), a plurality of second control signals (e.g., the second control signal CONT2) and a plurality of third control signals (e.g., the third control signal CONT3), and may further include a plurality of fourth control signals (e.g., the fourth control signal CONT4).

Figure 20A:
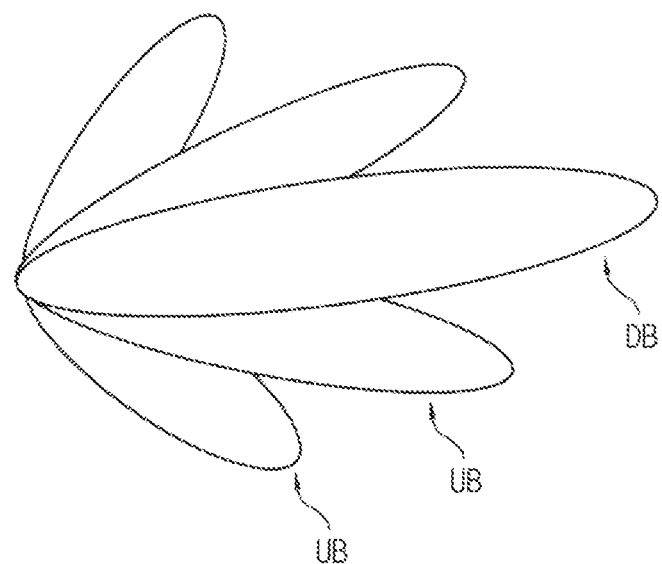
FIGS. 20A and 20B are diagrams for describing an operation of a beam-forming system according to example embodiments.
Figure 20B:
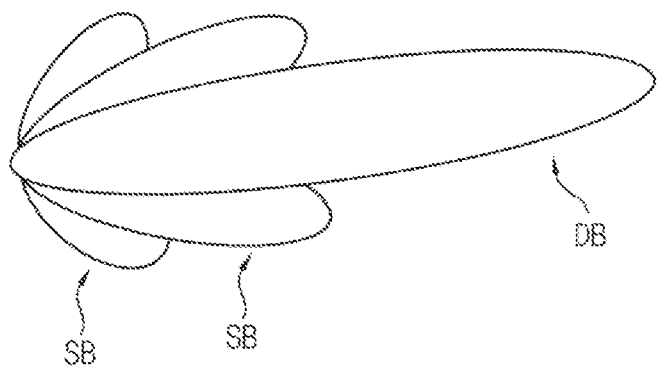

FIGS. 20A and 20B are diagrams for describing an operation of a beam-forming system according to example embodiments.

Referring to FIG. 20A, when all of the antennas emit beams of the same size in different directions, a waste of energy may occur. For example, a concentration of RF energy may be difficult as a beam DB in a desired direction and a beam in an undesired direction radiate to the same magnitude.

Referring to FIG. 20B, the beam DB in the desired direction may be maintained, the beam UB in the undesired direction may be converted into a suppressed beam SB by adjusting the gain and phase using the beam-forming circuit, and thus the RF energy may be efficiently concentrated in the desired direction.

Although examples where the beam-forming circuit includes only the multimode power amplifier 5100, 5100a, 6100, 6100a or 7100, the variable gain low noise amplifier 5200, 5200a, 6200, 6200a or 7200, and the variable gain phase shifter 5300, 5300a, 6300, 6300a, 7300 or 7350 are described, example embodiments are not limited thereto. For example, an additional gain amplifier may be disposed at a front stage or rear stage of the variable gain phase shifter to further increase the gain, and/or at least one block for gain increase, phase error reduction, linearity increase, etc. may be added. In addition, the variable gain phase shifter on the transmission path and/or the variable gain phase shifter on the reception path may be replaced with an active phase shifter and a VGA.

The above described embodiments may be applied to various communication devices and systems including the beam-forming circuit and various electronic devices and systems including the various communication devices and systems. For example, the example embodiments may be applied to devices or systems such as a mobile phone, a smart phone, a tablet computer, a laptop computer, a personal digital assistant (PDA), a portable multimedia player (PMP), a digital camera, a portable game console, a navigation device, a wearable device, an internet of things (IoT) device, an internet of everything (IoE) device, an e-book reader, a virtual reality (VR) device, an augmented reality (AR) device, a robotic device, or the like.

Particularly, the example embodiments may be applied to systems such as a 5G mobile communication system (e.g., about 28 GHz, 40 GHz, etc.), a military radar and communication system (e.g., X band, Ku band, W band, etc.), a satellite communication system (e.g., Ka band, etc.), an automotive radar (e.g., autonomous or self-driving vehicles) (e.g., about 79 GHz, etc.), a wireless power transmission (e.g., about 5.8 GHz, etc.), or the like.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A beam-forming circuit comprising:
   a multi mode power amplifier configured to amplify a first radio frequency (RF) intermediate signal generated based on a first RF input signal to generate a first RF output signal to be transmitted via an antenna in a transmission mode, and to perform a first transmission gain adjustment function based on a first control signal in the transmission mode;
   a variable gain low noise amplifier configured to amplify a second RF input signal received via the antenna to generate a second RF intermediate signal in a reception mode, and to perform a first reception gain adjustment function based on a second control signal in the reception mode;
   a variable gain phase shifter configured to control a gain and a phase of the first RF input signal at one time to generate the first RF intermediate signal in the transmission mode, to perform a second transmission gain adjustment function and a transmission phase adjustment function at one time based on a third control signal in the transmission mode, to control a gain and a phase of the second RF intermediate signal at one time to generate a second RF output signal in the reception mode, and to perform a second reception gain adjustment function and a reception phase adjustment function at one time based on the third control signal in the reception mode; and
   a first switch circuit configured to receive the first RF input signal to provide the first RF input signal to the variable gain phase shifter in the transmission mode, and to receive the second RF output signal from the variable gain phase shifter to output the second RF output signal in the reception mode.

2. The beam-forming circuit of claim 1, further comprising:
   a second switch circuit configured to connect one of the multi mode power amplifier and the first switch circuit with the variable gain phase shifter;
   a third switch circuit configured to connect one of the variable gain low noise amplifier and the first switch circuit with the variable gain phase shifter; and
   a fourth switch circuit configured to connect one of the multi mode power amplifier and the variable gain low noise amplifier with the antenna.

3. The beam-forming circuit of claim 2, wherein:
   in the transmission mode, a first path in which the first switch circuit, the third switch circuit, the variable gain phase shifter, the second switch circuit, the multi mode power amplifier, the fourth switch circuit and the antenna are sequentially connected is enabled based on a mode selection signal, and
   in the reception mode, a second path in which the antenna, the fourth switch circuit, the variable gain low noise amplifier, the third switch circuit, the variable gain phase shifter, the second switch circuit and the first switch circuit are sequentially connected is enabled based on the mode selection signal.

4. The beam-forming circuit of claim 1, further comprising:
   a first switch embedded impedance matching circuit disposed between the multi mode power amplifier, the first switch circuit and the variable gain phase shifter;
   a second switch embedded impedance matching circuit disposed between the variable gain low noise amplifier, the first switch circuit and the variable gain phase shifter; and
   a third switch embedded impedance matching circuit disposed between the multi mode power amplifier, the variable gain low noise amplifier and the antenna.

5. The beam-forming circuit of claim 4, wherein the first switch embedded impedance matching circuit includes:
   a first transmission line connected to an input terminal of the multi mode power amplifier;
   a second transmission line connected to a first terminal of the first switch circuit;
   a third transmission line connected to an output terminal of the variable gain phase shifter; and
   a first switching element connected in parallel with the first transmission line to the input terminal of the multi mode power amplifier.

6. The beam-forming circuit of claim 5, wherein:
   in the transmission mode, the first switching element is opened, and the first RF intermediate signal output from the variable gain phase shifter is provided to the multi mode power amplifier via the first, second and third transmission lines, and
   in the reception mode, the first switching element is shorted, and the second RF output signal output from the variable gain phase shifter is provided to the first switch circuit via the second and third transmission lines.

7. The beam-forming circuit of claim 5, wherein the second switch embedded impedance matching circuit includes:
   a fourth transmission line connected to an output terminal of the variable gain low noise amplifier;
   a fifth transmission line connected to a second terminal of the first switch circuit;
   a sixth transmission line connected to an input terminal of the variable gain phase shifter; and
   a second switching element connected in parallel with the fourth transmission line to the output terminal of the variable gain low noise amplifier.

8. The beam-forming circuit of claim 7, wherein:
   in the transmission mode, the second switching element is shorted, and the first RF input signal received from the first switch circuit is provided to the variable gain phase shifter via the fifth and sixth transmission lines, and
   in the reception mode, the second switching element is opened, and the second RF intermediate signal output from the variable gain low noise amplifier is provided to the variable gain phase shifter via the fourth, fifth and sixth transmission lines.

9. The beam-forming circuit of claim 7, wherein the third switch embedded impedance matching circuit includes:
   a seventh transmission line connected to an output terminal of the multi mode power amplifier;
   an eighth transmission line connected to the antenna;
   a ninth transmission line connected to an input terminal of the variable gain low noise amplifier;

a third switching element connected in parallel with the seventh transmission line to the output terminal of the multi mode power amplifier; and a fourth switching element connected in parallel with the ninth transmission line to the input terminal of the variable gain low noise amplifier.

10. The beam-forming circuit of claim 9, wherein:

in the transmission mode, the third switching element is opened, the fourth switching element is shorted, and the first RF output signal output from the multi mode power amplifier is provided to the antenna via the seventh and eighth transmission lines, and in the reception mode, the third switching element is shorted, the fourth switching element is opened, and the second RF input signal received from the antenna is provided to the variable gain low noise amplifier via the eighth and ninth transmission lines.

11. The beam-forming circuit of claim 1, wherein:

when the first transmission gain adjustment function is performed, a gain of the first RF output signal with respect to the first RF input signal is controlled by a first unit, and when the second transmission gain adjustment function is performed, the gain of the first RF output signal with respect to the first RF input signal is controlled by a second unit smaller than the first unit.

12. The beam-forming circuit of claim 11, wherein:

when the first reception gain adjustment function is performed, a gain of the second RF output signal with respect to the second RF input signal is controlled by a third unit in a first gain region, and when the second reception gain adjustment function is performed, the gain of the second RF output signal with respect to the second RF input signal is controlled by the second unit in a second gain region different from the first gain region.

13. The beam-forming circuit of claim 1, wherein an amplification mode of the multi mode power amplifier is changed based on the first control signal.

14. The beam-forming circuit of claim 1, wherein the variable gain low noise amplifier further performs a phase change compensation function based on the second control signal.

15. The beam-forming circuit of claim 1, wherein the variable gain phase shifter is configured to control the gain and the phase of the first RF input signal at one time or to control the gain and the phase of the second RF intermediate signal at one time by adjusting magnitudes and directions of at least two in-phase vectors and at least two quadrature vectors based on the third control signal and by summing the at least two in-phase vectors and the at least two quadrature vectors.

16. A beam-forming circuit comprising:

a multi mode power amplifier configured to amplify a first radio frequency (RF) intermediate signal generated based on a first RF input signal to generate a first RF output signal to be transmitted via an antenna in a transmission mode, and to perform a first transmission gain adjustment function based on a first control signal in the transmission mode;

a variable gain low noise amplifier configured to amplify a second RF input signal received via the antenna to generate a second RF intermediate signal in a reception mode, and to perform a first reception gain adjustment function based on a second control signal in the reception mode;

a first variable gain phase shifter configured to control a gain and a phase of the first RF input signal at one time to generate the first RF intermediate signal in the transmission mode, and to perform a second transmission gain adjustment function and a transmission phase adjustment function at one time based on a third control signal in the transmission mode;

a second variable gain phase shifter configured to control a gain and a phase of the second RF intermediate signal at one time to generate a second RF output signal in the reception mode, and to perform a second reception gain adjustment function and a reception phase adjustment function at one time based on a fourth control signal in the reception mode;

a first switch circuit configured to provide the first RF input signal to the first variable gain phase shifter in the transmission mode, and to receive the second RF output signal from the second variable gain phase shifter to output the second RF output signal in the reception mode; and a second switch circuit configured to provide the first RF output signal to the antenna in the transmission mode, and to provide the second RF input signal to the variable gain low noise amplifier in the reception mode.

17. The beam-forming circuit of claim 16, wherein:

in the transmission mode, a first path in which the first switch circuit, the first variable gain phase shifter, the multi mode power amplifier, the second switch circuit and the antenna are sequentially connected is enabled based on a mode selection signal, and in the reception mode, a second path in which the antenna, the second switch circuit, the variable gain low noise amplifier, the second variable gain phase shifter and the first switch circuit are sequentially connected is enabled based on the mode selection signal.

18. The beam-forming circuit of claim 16, wherein:

when the first transmission gain adjustment function is performed, a gain of the first RF output signal with respect to the first RF input signal is controlled by a first unit, and when the second transmission gain adjustment function is performed, the gain of the first RF output signal with respect to the first RF input signal is controlled by a second unit smaller than the first unit.

19. The beam-forming circuit of claim 18, wherein:

when the first reception gain adjustment function is performed, a gain of the second RF output signal with respect to the second RF input signal is controlled by a third unit in a first gain region, and when the second reception gain adjustment function is performed, the gain of the second RF output signal with respect to the second RF input signal is controlled by the second unit in a second gain region different from the first gain region.

20. The beam-forming circuit of claim 18, wherein:

when the second reception gain adjustment function is performed, a gain of the second RF output signal with respect to the second RF input signal is controlled by a third unit, and when the first reception gain adjustment function is performed, the gain of the second RF output signal with respect to the second RF input signal is controlled by a fourth unit smaller than the third unit.

* * * * *